United States Patent
Beavers et al.

(10) Patent No.: US 6,307,701 B1
(45) Date of Patent: Oct. 23, 2001

(54) VARIABLE SPEED RECORDING METHOD AND APPARATUS FOR A MAGNETIC TAPE DRIVE

(75) Inventors: Kelly J. Beavers, Boulder; Michael A. Blatchley, Longmont; David L. Detro, Longmont; Christopher J. Turner, Longmont; Thomas E. Zaczek, Louisville, all of CO (US)

(73) Assignee: Ecrix Corporation, Boulder, CO (US)

( * ) Notice: Subject to any disclaimer, the term of this patent is extended or adjusted under 35 U.S.C. 154(b) by 0 days.

(21) Appl. No.: 09/176,079

(22) Filed: Oct. 20, 1998

(51) Int. Cl.⁷ .................................................. G11B 15/46

(52) U.S. Cl. ............................................ 360/73.08; 60/53

(58) Field of Search ................................. 360/53, 73.01, 360/73.04, 73.08, 60, 77.12, 77.13

(56) References Cited

U.S. PATENT DOCUMENTS

| | | |
|---|---|---|
| 3,821,710 | 6/1974 | Arciprete et al. . |
| 3,962,727 | 6/1976 | Kamimura et al. . |
| 4,011,587 | 3/1977 | Arter et al. . |
| 4,099,211 | 7/1978 | Hathaway . |
| 4,106,065 | 8/1978 | Ravizza . |
| 4,125,881 | 11/1978 | Eige et al. . |
| 4,172,265 | 10/1979 | Sakamoto et al. . |
| 4,175,267 | 11/1979 | Tachi . |
| 4,215,377 | 7/1980 | Norris . |
| 4,257,075 | 3/1981 | Wysocki et al. . |
| 4,293,879 | 10/1981 | Heitmann et al. . |
| 4,357,639 | 11/1982 | Hama et al. . |
| 4,390,915 | 6/1983 | Matsuyama . |
| 4,394,694 | 7/1983 | Ninomiya et al. . |
| 4,404,605 | 9/1983 | Sakamoto . |
| 4,412,260 | 10/1983 | Stricklin et al. . |

(List continued on next page.)

FOREIGN PATENT DOCUMENTS

| | | |
|---|---|---|
| 29 06 836 A1 | 9/1980 | (DE) . |
| 0540352 | 5/1993 | (EP) . |
| 56-93157 | 7/1981 | (JP) . |
| 58-133665 | 2/1982 | (JP) . |
| 57-55579 | 4/1982 | (JP) . |
| 57205845 | 12/1982 | (JP) . |
| 59-139157 | 1/1983 | (JP) . |
| 02240867 | 9/1990 | (JP) . |
| 04134526 | 5/1992 | (JP) . |
| 06202814 | 7/1994 | (JP) . |
| 9526552 | 5/1995 | (WO) . |

OTHER PUBLICATIONS

Pizzi, New Audio Recording Formats, Broadcast Engineering, Feb. 1993, paragraph. 60–63.

NT–1, Apr. 1992.

Sasake, T., Asltad, J., Younker, M., The NT Digital Mcro Tape Recorder, Goddard Conference on Mass Storage Systems and Technologies, Sep. 22–24, 1992, paragraph. 143–157.

*Primary Examiner*—Andrew L. Sniezek
(74) *Attorney, Agent, or Firm*—Jessica Clement

(57) ABSTRACT

A method and apparatus for varying track recording speed to maximize host-to-tape data transfer rates is presented. Variable data transfer rates of host systems and networks are accommodated by continually adjusting the tape speed to match the tape drive to the host's actual transfer rate. The speed of the tape is adjusted according to both the level of data present in the tape drive data buffer and whether the current mode of the drive is write mode or read mode. In the preferred embodiment, when the tape speed is accelerated or decelerated while writing a number of data track pairs to tape, a predetermined number of dummy track pairs are first written to tape at the current speed. On the next write head phase after the speed is increased or decreased as appropriate while the read heads are over the track, a predetermined number of dummy track pairs followed by more data track pairs are written to the tape at the new speed.

13 Claims, 18 Drawing Sheets

U.S. PATENT DOCUMENTS

| | | |
|---|---|---|
| 4,420,778 | 12/1983 | Sakamoto . |
| 4,467,373 | 8/1984 | Taylor et al. . |
| 4,484,236 | 11/1984 | Wilkinson . |
| 4,486,796 | 12/1984 | Sakamoto . |
| 4,491,886 | 1/1985 | Saito et al. . |
| 4,492,991 | 1/1985 | Osada et al. . |
| 4,544,967 | 10/1985 | Louth . |
| 4,554,598 | 11/1985 | Tarbox et al. . |
| 4,581,662 | 4/1986 | Sato . |
| 4,609,947 | 9/1986 | Yamagiwa et al. . |
| 4,614,991 | 9/1986 | Murakami . |
| 4,620,245 | 10/1986 | Shimizu . |
| 4,628,372 | 12/1986 | Morisawa . |
| 4,628,383 | 12/1986 | Miyamoto . |
| 4,636,873 | 1/1987 | Eguchi . |
| 4,637,023 | 1/1987 | Lounsbury et al. . |
| 4,641,210 | 2/1987 | Ohyama . |
| 4,642,714 | 2/1987 | Miyamoto . |
| 4,644,414 | 2/1987 | Yamada et al. . |
| 4,651,239 | 3/1987 | Omori et al. . |
| 4,654,731 | 3/1987 | Froschl et al. . |
| 4,663,673 | 5/1987 | Doutsubo . |
| 4,665,447 | 5/1987 | Odaka . |
| 4,677,504 | 6/1987 | Yamazaki et al. . |
| 4,680,654 | 7/1987 | Shibuya . |
| 4,682,247 | 7/1987 | Doutsbo . |
| 4,688,109 | 8/1987 | Sangu . |
| 4,703,373 | 10/1987 | Oosaka . |
| 4,714,971 | 12/1987 | Sigiki et al. . |
| 4,717,974 | 1/1988 | Baumeister . |
| 4,731,678 | 3/1988 | Takeuchi . |
| 4,737,865 | 4/1988 | Murakami et al. . |
| 4,739,420 | 4/1988 | Odaka et al. . |
| 4,758,904 | 7/1988 | Takahashi et al. . |
| 4,758,911 | 7/1988 | Nakano et al. . |
| 4,760,474 | 7/1988 | Takimoto . |
| 4,769,811 | 9/1988 | Eckberg, Jr. et al. . |
| 4,774,605 | 9/1988 | Kato . |
| 4,786,011 | 11/1988 | Fujiwara et al. . |
| 4,796,115 | 1/1989 | Ohshima et al. . |
| 4,799,221 | 1/1989 | Fukami et al. . |
| 4,802,172 | 1/1989 | Fukami et al. . |
| 4,812,924 | 3/1989 | Fukami et al. . |
| 4,821,129 | 4/1989 | Culp . |
| 4,835,628 | 5/1989 | Hinz et al. . |
| 4,843,495 | 6/1989 | Georgis et al. . |
| 4,845,577 | 7/1989 | Georgis et al. . |
| 4,897,739 | 1/1990 | Hasegawa et al. . |
| 4,918,546 | 4/1990 | Saito . |
| 4,930,027 | 5/1990 | Steele et al. . |
| 4,933,784 | 6/1990 | Oldershaw et al. . |
| 4,935,824 | 6/1990 | Nakano et al. . |
| 4,935,827 | 6/1990 | Oldershaw et al. . |
| 4,970,612 | 11/1990 | Renders et al. . |
| 4,977,469 | 12/1990 | Yokozawa . |
| 4,984,104 | 1/1991 | Takahashi et al. . |
| 5,003,411 | 3/1991 | Nagahara et al. . |
| 5,034,833 | 7/1991 | Marlowe . |
| 5,050,018 | 9/1991 | Georgis et al. . |
| 5,068,757 | 11/1991 | Hughes et al. . |
| 5,103,355 | 4/1992 | Steele . |
| 5,115,500 | 5/1992 | Larsen . |
| 5,142,422 | 8/1992 | Zook et al. . |
| 5,191,491 | 3/1993 | Zweighaft . |
| 5,251,077 | 10/1993 | Saitoh . |
| 5,262,905 | 11/1993 | Takagi et al. . |
| 5,303,095 * | 4/1994 | Vuong ..................................... 360/46 |
| 5,327,305 | 7/1994 | Thomas . |
| 5,349,479 | 9/1994 | Arimura et al. . |
| 5,349,481 | 9/1994 | Kauffman et al. . |
| 5,414,570 | 5/1995 | Fry et al. . |
| 5,535,068 | 7/1996 | Hughes . |
| 5,602,694 | 2/1997 | Miles et al. . |
| 5,633,764 | 5/1997 | Ohta . |
| 5,717,534 * | 2/1998 | Yahagi et al. ................. 360/73.08 X |
| 5,742,444 | 4/1998 | Ozue . |
| 5,781,688 | 7/1998 | Seong . |
| 5,825,572 | 10/1998 | Morita . |
| 5,872,997 | 2/1999 | Golson . |
| 5,953,177 | 9/1999 | Hughes . |

* cited by examiner

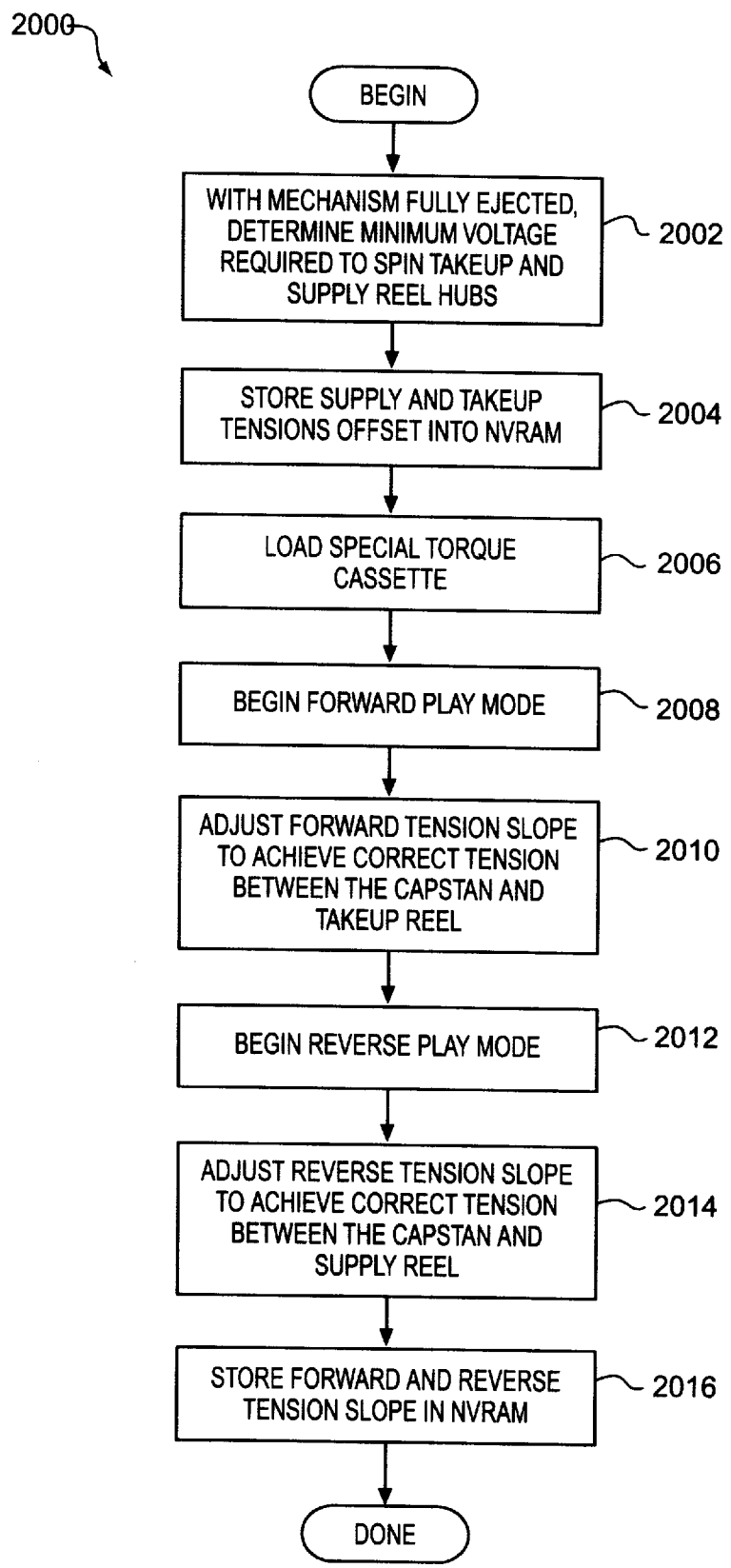

VARIABLE SPEED RECORDING METHOD AND APPARATUS FOR A MAGNETIC TAPE DRIVE

FIELD OF THE INVENTION

The present invention pertains generally to magnetic tape drives, and more particularly to a variable speed data recording/recovery mechanism and method thereof.

RELATED PATENTS

The present invention is related to co-pending U.S. patent application entitled "Overscan Helical Scan Head for Non-Tracking Tap Subsystems Reading at up to 1x Speed and Method for Simulation of Same", invented by Blatchley et al., and having an internal docket number of 9086/104 and a Ser. No. of 09/176,013, filed concurrently herewith on Oct. 20, 1998, and co-pending U.S. patent application entitled "Fine Granularity Rewrite Method and Apparatus for Data Storage Device", invented by Zaczek, and having an internal docket number of 9086/106 and a Ser. No. of 09/176,015, filed concurrently herewith on Oct. 20, 1998, and U.S. patent application entitled "Multi-level Error Detection and Correction Technique for Data Storage Recording Device", invented by McAuliffe et al., and having an internal docket number of 9086/102 and a Ser. No. of 09/176,014, filed concurrently herewith on Oct. 20, 1998, all of which are commonly owned and all of which are hereby incorporated by reference, and U.S. patent application entitled "Method And Apparatus For Logically Rejecting Previously Recorded Track Residue From Magnetic Media", invented by McAuliffe et al., and having an internal docket number of 9086/103 and a Ser. No. of 09/192,794, filed on Nov. 16, 1998, and co-pending U.S. patent application entitled "Method And System For Monitoring And Adjusting Tape Position Using Control Data Packets", invented by McAuliffe et al., and having an internal docket number of 9086/107 and a Ser. No. of 09/193,030, filed on Nov. 16, 1998, and co-pending U.S. patent application entitled "Rogue Packet Detection And Correction Method For Data Storage Device", invented by McAuliffe et al., and having an internal docket number of 9086/105 and a Ser. No. of 09/192,809, filed on Nov. 16, 1998, and co-pending U.S. patent application entitled "A Method Of Reacquiring Clock Synchronization On A Non-Tracking Helical Scan Tape Device", invented by Blatchley et al., and having an internal docket number of 9086/108 and a Ser. No. of 09/192,808, filed on Nov. 16, 1998.

BACKGROUND OF THE INVENTION

Tape storage technology is routinely used for routine system back up and long-term data archiving. Various tape technologies such as DAT, DLT, and 8 mm, have been developed over recent years to meet industry needs for higher performance and increased data storage capacity. While they differ widely in format, capacity, and performance, conventional tape storage devices rely on some form of track-following architecture. Whether the underlying recording technology is based on linear serpentine or helical scan recording, track-following architecture tape drives attempt to read a track completely in a single pass using a single head assembly and operating at a single fixed tape speed. The drive mechanism and media tolerances are tightly controlled to maintain a very precise alignment between the path traced by the heads and the written tracks on a tape.

Track-following architecture tape drives save some common inherent limitations. To either write or read data, track-following tape technologies depend upon a constant head-to-tape speed for linear recording or constant track pitch for helical scan recording. Accordingly, the tape drive must either receive stream data at a constant transfer rate, or, when this does not occur, initiate a stop/backhitch/start sequence.

Due to normal speed variations found in network and workstation applications, the data transfer rate to or from the host rarely matches the tape drive's fixed read or write speed. Whenever a mismatch occurs, the read or write operation is suspended and the tape is repositioned backwards to allow enough space to accelerate again to the forward operating speed. The time required for this repositioning cycle, known as backhitching, increases data retrieval time.

Furthermore, backhitching not only impairs performance, but also seriously impacts data reliability. In operation, backhitching induces extremely high transient forces that greatly increase tape wear and reduce the mechanical reliability of the drive.

Another limitation imposed by the track-following architecture is the significant area of the tape required to record track-following servo data. This servo overhead consumes physical space on the tape and limits the amount of data that can be written onto an individual tape.

Finally, the tight tolerances required for track-following technologies challenge the production margins of even the most sophisticated manufacturing facilities. Minute differences in assembly result in data availability and tape interchange issues. Nominal production variations, sometimes accentuated by differences in handling or environmental conditions, can make it impossible to exchange media between supposedly identical units from the same manufacturer. In other words, data written on one tape drive may not be read on another similar tape drive.

In view of the inherent limitations of track-following tape control architectures and need in the tape drive industry to keep pace with the disk drive industry in terms of performance, capacity, and cost, a need exists for a new methodology for delivering the required performance and capacity while reducing costs to the end-user.

SUMMARY OF THE INVENTION

The present invention is a novel method and apparatus for varying track recording speed to maximize host-to-tape data transfer rates. Variable data transfer rates of host systems and networks are accommodated by continually adjusting the tape speed to match the tape drive to the host's actual transfer rate. This speed-matching capability eliminates backhitching along with its associated delays and reliability impacts.

In accordance with the invention, the speed of the tape is adjusted according to both the level of data present in the tape drive data buffer and whether the current mode of the drive is write mode or read mode. In the preferred embodiment, when the tape speed is accelerated or decelerated while writing a number of data track pairs to tape, a predetermined number of dummy track pairs are first written to tape at the current speed. On the next write head phase after the speed is increased or decreased as appropriate while the read heads are over the track, a predetermined number of dummy track pairs followed by more data track pairs are written to the tape at the new speed. Any resulting previously recorded track residue zones or overlap zones do not affect the reliability of any data written onto the tape since they occur between dummy track pairs, a detectable condition in read mode.

The present invention eliminates larger data errors that occur with traditional designs due to limitations of track following servo system and track curvature. These errors historically flow from tension variations, mechanical misalignment, interchange tolerances, and tape edge wear and damage. The tape speed control is based upon the maximum data transfer rate to the host computer or the fastest rate the device can receive data on reading. For writing operations, the speed control is based upon either the fastest rate the system will support or the speed data is received from a host computer. The speed of a remote host is matched for data transfer although data reading from the tape is possible even with the tape stopped.

BRIEF DESCRIPTION OF THE DRAWING

The invention will be better understood from a reading of the following detailed description taken in conjunction with the drawing in which like reference designators are used to designate like elements, and in which:

FIG. 7($b$) is a graphical view of tape speed plotted against tape position and further correlated with the content of a data buffer for an example write operation;

FIG. 12($b$) is a side view of a portion of tape that illustrates recorded track angle changes resulting from deceleration in tape speed;

FIG. 13($b$) is a side view of a portion of tape that illustrates an overlap zone resulting from variations in the acceleration control after an acceleration in tape speed from a completely stopped position;

FIG. 18($b$) is a side view of a portion of tape that illustrates how data is read from a tape having track angle changes resulting from a deceleration in tape speed;

FIG. 20 is a flowchart of the calibration method used by reel tension controller.

DETAILED DESCRIPTION

A variable speed recording mechanism and method for a tape drive for supporting variable data transfer rates from a host system is described in detail hereinafter.

Figure 1:
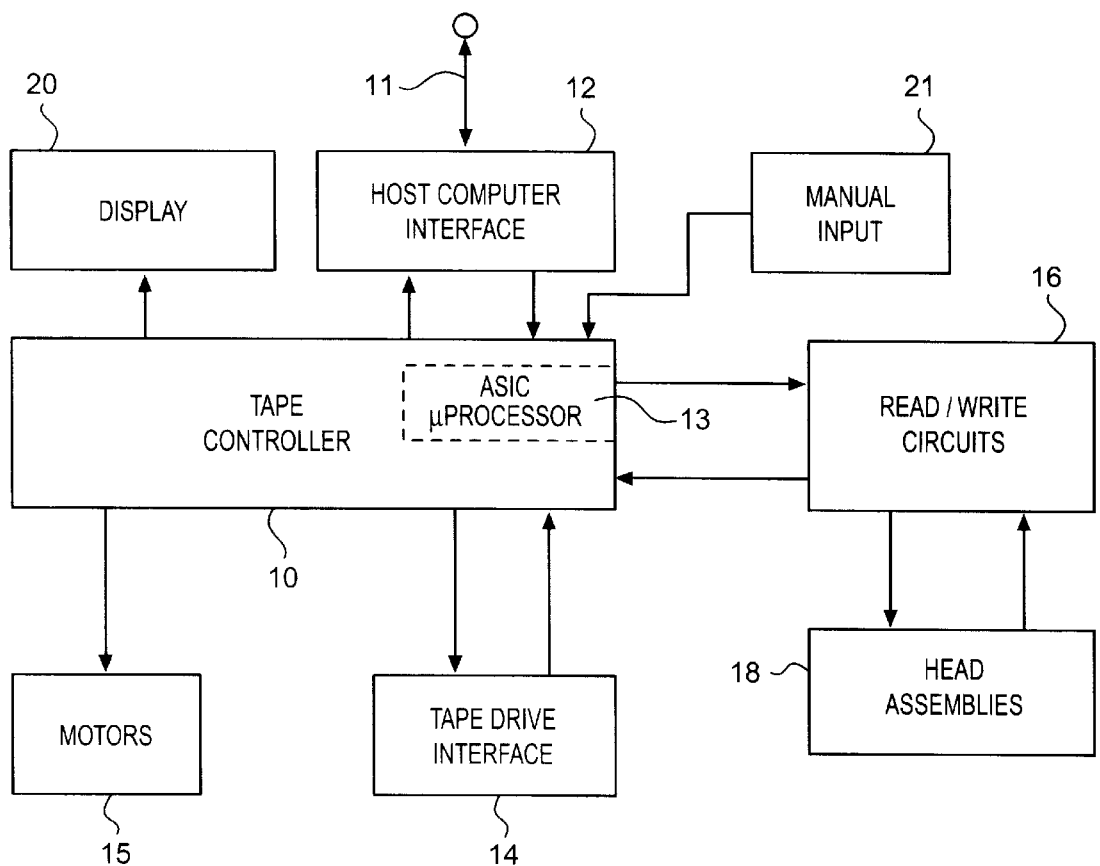
FIG. 1 is a block diagram of a tape drive in accordance with the invention.

FIG. 1 is a block diagram illustrating the functionality of a tape drive in accordance with the invention. Tape controller 10 manages a plurality of functionally separated blocks, including a host computer interface 12, a tape drive interface 14 which electromechanically cooperates with motors 15 for performing various drive functions, and read/write circuitry 16 which response to commands from the controller 10 to perform reading and writing functions relative to the tape through head assemblies 18. Interaction with the user is through display 20 and manual input 21. Typically, tape controller 10 is an application specific integrated circuit (ASIC) that includes a microprocessor 13.

Figure 2:
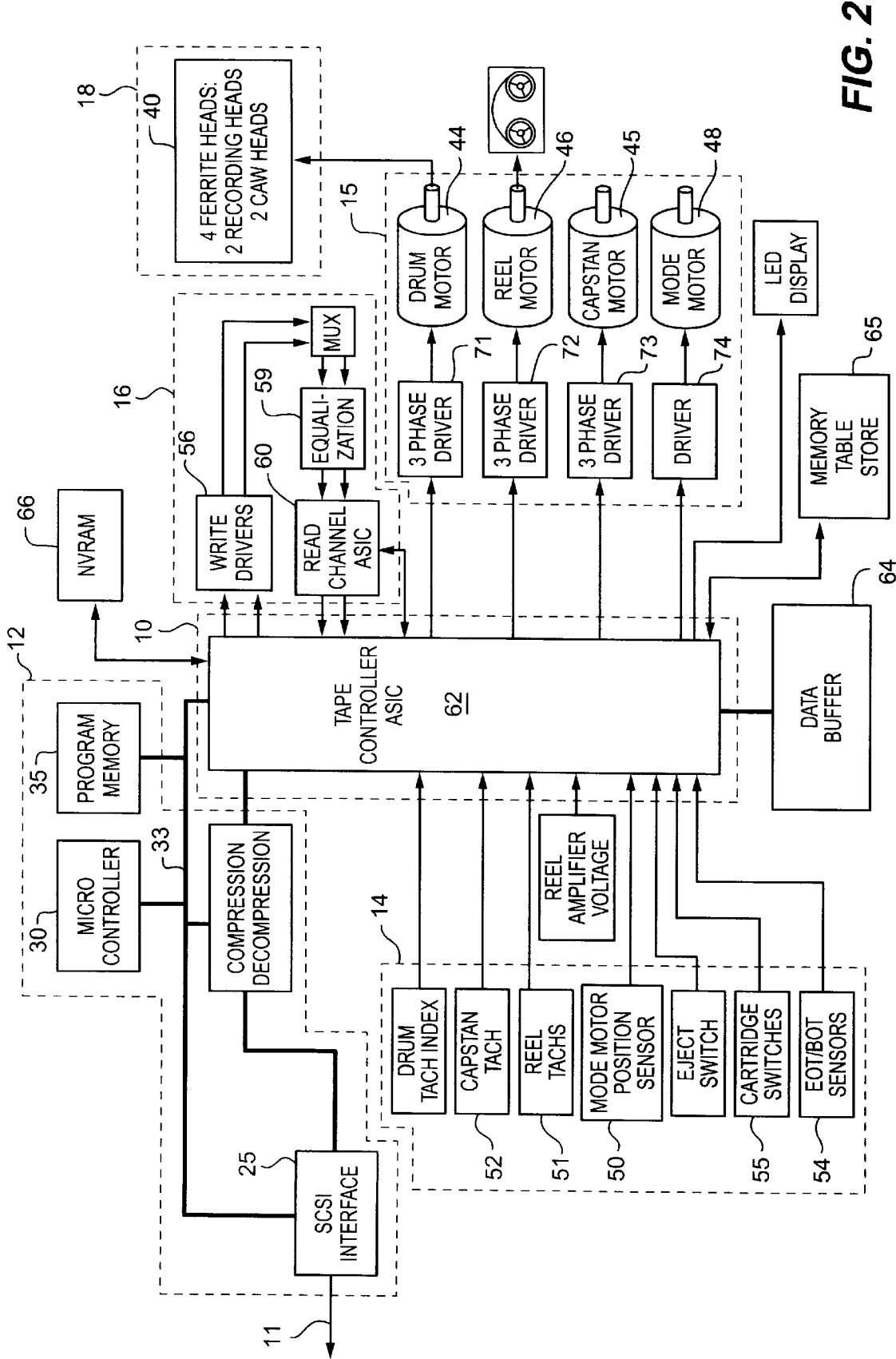
FIG. 2 is a more detailed block diagram of a tape drive implemented in accordance with one embodiment of the present invention.

FIG. 2 is a more detailed block diagram of a tape drive implemented in accordance with one embodiment of the present invention. In this embodiment, host computer interface 12 is implemented in the form of a Small Computer System Interface (SCSI), which includes a SCSI interface integrated circuit 25 to provide an interface between host interface microcontroller 30 and SCSI bus connector 26. Microcontroller 30 provides a control mechanism to support data and command transfers on the SCSI bus 11 according to the standard SCSI interface protocol. Microcontroller 30 performs high-level tape control functions via tape controller 10. Host interface microcontroller 30 communicates with tape controller 10 over bus 33. Program memory 35 stores a control program for host interface microcontroller 30, which is either an electrically erasable and reprogrammable programmable memory (Flash EPROM) or a static random access memory (SRAM).

Head assembly 18 includes the recording and check-after-write (CAW) heads 40. These are four ferrite heads mounted on a rotor assembly 40. The recording heads convert the input electrical signals into a magnetic near-field equivalent that is impressed onto the magnetic tape. All four heads are useable to read data from the tape. In read mode, the impressed magnetic field from the tape is converted by the head and output as an equivalent electrical signal. The CAW heads are located behind the recording heads and are always used to read data from the tape, but during write mode are used exclusively to verify that the written data is reliably readable.

Motors 15 include drum motor 44, capstan motor 45, reel motor 46, and load/mode motor 48. Drum motor 44 drives the rotating heads assembly 40 that scans the tape surface in a helical pattern. Capstan motor 45 drives the capstan, which is responsible for regulating tape speed. The capstan motor 45 is bi-directional and can drive the tape in the forward or reverse direction. Reel motor 46 drives the supply and take-up reels of the tape cartridge and can likewise drive the tape in either direction. The load/mode motor 48 provides power to a mechanical mechanism that loads and unloads the tape cartridge from the tape mechanism. It is also used to select the mode of operation, i.e.: forward, reverse, fast forward and rewind. Tape controller 10 controls each of drum motor 44, capstan motor 45, and reel motor 46 via respective 3-phase driver circuits 71, 72, and 73. Load/mode motor 48 is controlled by tape controller via motor driver circuit 74. Motor drivers 71, 72, 73, 74 are conventional voltage/current translation interfaces that are external to digital ASIC 62.

Tape drive interface 14 includes sensors for determining the position and status of a tape cartridge in the cartridge mechanism. Load/mode motor position sensor 50 provides feedback on the position of the mode control mechanism. This is used by tape controller 10 to control the operation of the mode motor 48. Reel tachometers 51 provide speed feedback information for each reel. This is used by tape controller 10 to control reel speed. Reel voltage measurements are monitored and used to control the tape tension between the capstan and takeup reel during forward movement of the tape and between the capstan and supply reel during backward movement of the tape. Capstan tachometer 52 can typically be a single-phase tachometer that provides speed information about the capstan. It is used by tape controller 10 to verify proper direction and speed control of the capstan motor 45. End-of-tape (EOT) and beginning-of-tape (BOT) indicators are sensed by optical sensors 54 when the transparent tape leader passes in front of those sensors. This information is used by tape controller 10 to stop the reel motor(s) 46 and capstan motor 45.

Cartridge switches 55 interact with specific locations of the tape cartridge to provide tape controller 10 with information about the tape cartridge such as whether a tape cartridge is inserted in the drive, the type of tape (data vs. cleaning), the length of the tape, and its write protection status.

Read/write circuitry 16 manages the conversion of digital data from tape controller 10 into analog signals that are appropriate for the recording heads 40 and vice versa. It includes write driver 56 which convert the digital data stream from tape controller 10 into a large enough current to drive the recording heads 40. Equalization circuit 59 is a series of filters designed to reduce noise and condition the signal out from the read heads 40. An analog application specific integrated circuit (ASIC) 60 is responsible for creating a clock and data stream from the serial data stream received from the read heads 40 after being passed through equalization circuit 59.

Tape controller 10 interfaces with a host system via SCSI controller 25, and with the tape drive via the tape drive interface 14 and motors 15. Controller 10 employs a digital ASIC 62 for a variety of functions including among others speed and direction control of all motors, data formatting and unformatting, and generation and use of error correction. A static random access memory (SRAM) 64 provides a large memory that is used as a data buffer to temporarily store data before being transferred from the host onto tape, or before being transferred from tape to the host. Another memory 65 is a relatively small SRAM memory used to store table and error correction redundant terms. It is also used to temporarily buffer small amounts of data from the data stream between the tape controller 10 and the read/write circuitry 16.

A small, non-volatile random access memory (NVRAM) 66 stores personality information about the drive such as serial number and drive calibration parameters.

The tape drive in the illustrative embodiment utilizes an 8 mm tape cartridge that has tracks recorded thereon in a helical scan pattern. It is, for example, intended to store 33 gigabytes of data with recovery speeds of up to 3 megabytes per second and a 5.25 inch form factor. It relies upon a variable speed architecture wherein servo controls are applied to tape speed and position during read operations. The variable speed architecture permits excellent performance under all conditions and reduces wear of heads, mechanisms, and media by eliminating reposition cycles characteristic of streaming tape drives. It is also relatively simple and low cost to design.

Figure 3:
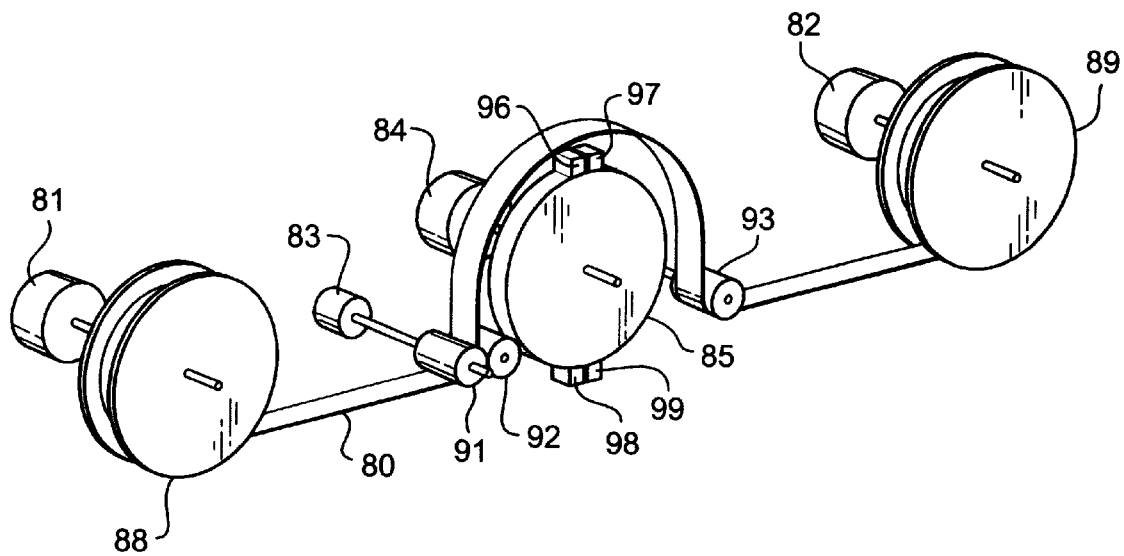
FIG. 3 is a top angular view of a tape path in one embodiment of the tape transport mechanism.
Figure 4:
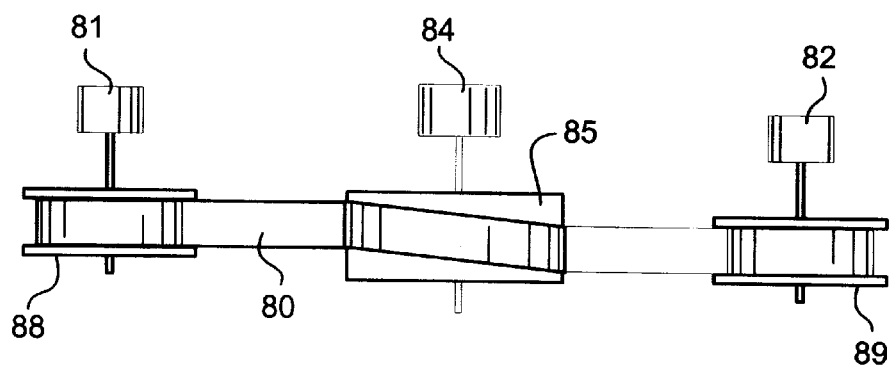
FIG. 4 is a side view of the tape transport mechanism of FIG. 3.

FIG. 3 is a top angular view and FIG. 4 is a side view of the tape path resulting from one arrangement of motors including reel drive motor 82, capstan motor 83, drum motor 84, and drum 85. Drum 85 cooperates with capstan 91 and idler rollers 92 and 93 to retain the tape 80 in an arc of 196 degrees relative to the circumferential periphery of drum 85.

Capstan 91 is operated by capstan motor 83 so as to modify the position of tape 80 relative to the path of head 96, 97, 98, 99 rotating on drum 85 to maximize the rate at which packets are read from tape 80. In other words, the relationship between tape position (or track position) and the path of the read/write heads is adjustable to alter the rate at which data is read from the tape. In the illustrative embodiment, data is read over a continuously variable transfer rate of up to a maximum of over 100% of the rate at which data is nominally recorded.

Data is written at integer fractions of the nominal recording data rate with a "pause" mode available for use during both read and write operations, discussed hereinafter with respect to FIGS. 7(*a*) and 7(*b*). Pause mode is useful when data over-run or data under-run conditions occur.

Data is written in tracks in an alternate azimuth, helical pattern by heads 96–99 on drum rotor 85 with an alternate azimuth technique. That is, a pair of alternate azimuth data tracks are recorded simultaneously at an angle across the tape by a pair alternate azimuth adjacent write heads. A tape speed servo controller (not shown) maintains the period of drum rotor 85 and speed of tape 80. Data is checked half a drum rotation after writing by a pair of alternate azimuth CAW heads located 180 degrees relative to the pair of write heads, and offending tracks rewritten "on the fly" as required. Accordingly, for each rotation of drum rotor 85, two tracks are written and a write check of those two tracks is performed.

Data is read with all four heads 96–99 using the alternate azimuth reading technique. The tape speed servo controller, discussed in detail hereinafter, maintains the period of drum rotor 85 and speed of tape 80. The tape 80 advances a maximum of one track per rotation and error correction is effected after scanning the track with both like-azimuth heads.

Figure 5:
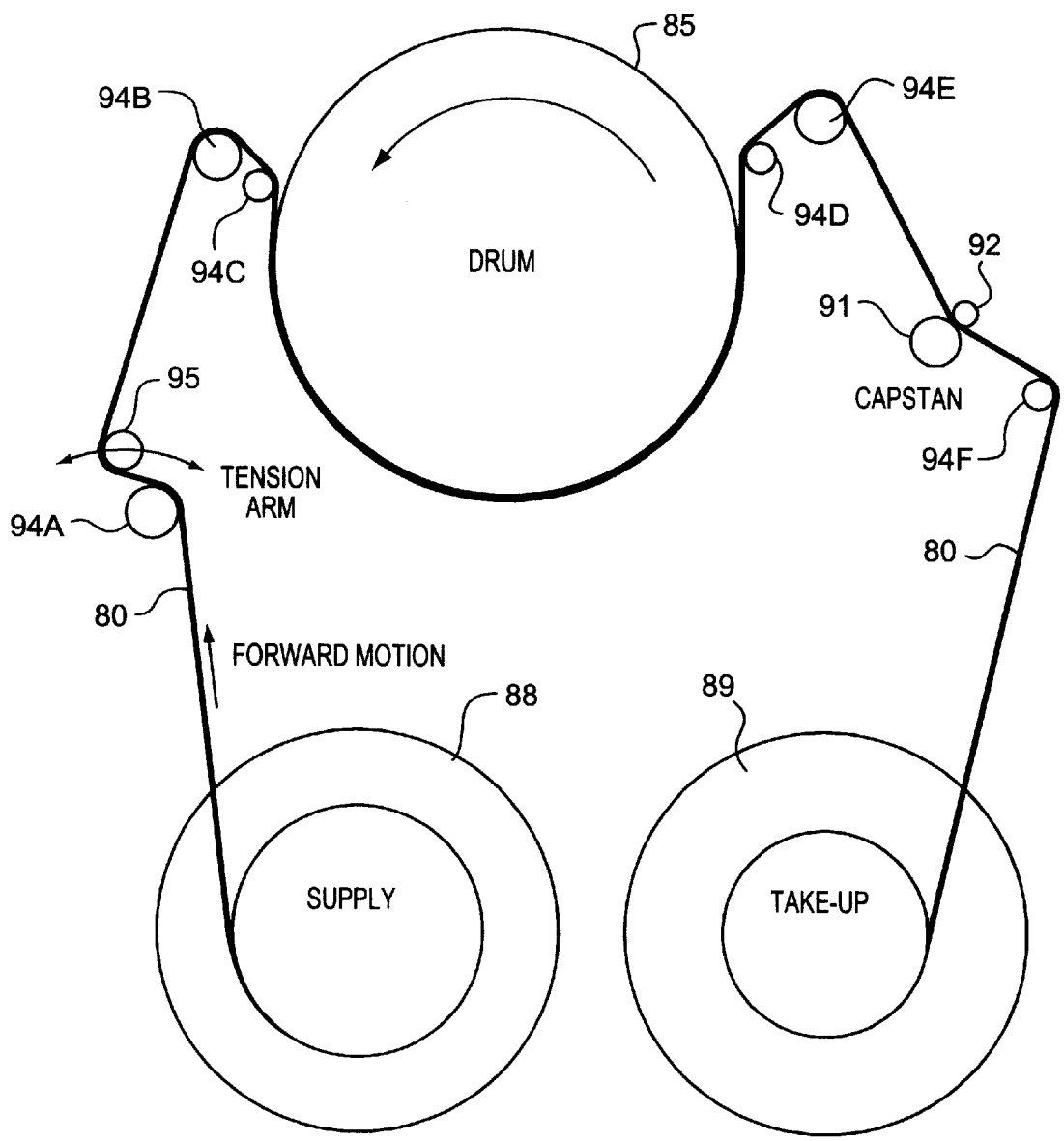
FIG. 5 is a top view of the tape transport mechanism of FIG. 3.

FIG. 5 is a top view of the tape drive configuration of FIGS. 3 and 4, illustrating the path followed by tape 80. Tape 80 circulates between supply reel 88 and take-up reel 89 after passing over a series of idler rollers 94*a*, 94*b*, 94*c*, 94*d*, 94*e*, and 94*f*, a biased tension arm and roller 95, and between capstan 91 and pinch roller 92. Drum 85 rotates so as to magnetically exchange data between heads 96–99 (see FIG.

3) mounted thereon and tape 80 as it passes over the periphery of the drum 85.

Figure 6:
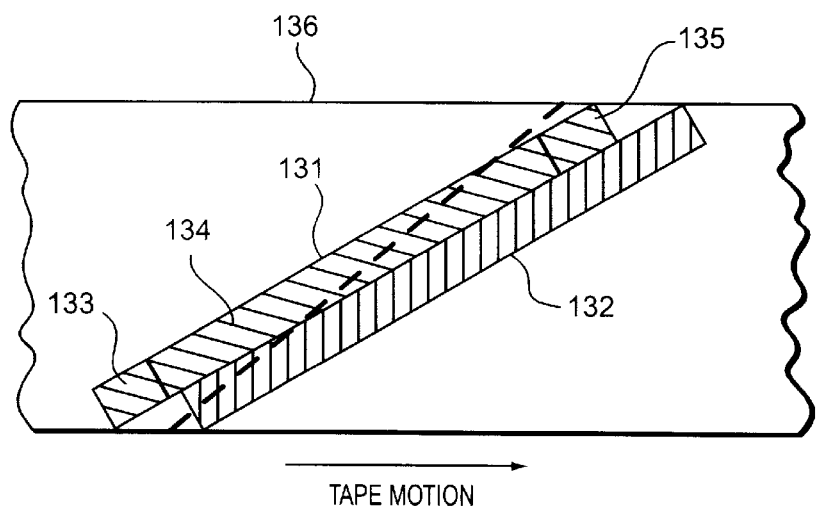
FIG. 6 is a side view of a portion of a magnetic tape illustrating a track pair.

FIG. 6 is a side view of a portion of a magnetic tape 136 illustrating the angle and position of a pair of typical data tracks 131 and 132 written on it. While only two tracks 131 and 132 are shown, it is understood that many more tracks can precede and/or follow these two examples. Each data track 131, 132 is similar and includes a track packet 133, a series of data packets 134, and an error correction packet 135. In the illustrative embodiment, data packets 134 include approximately four hundred packets of data comprising up to sixty-four user bytes of data.

The variable speed architecture of the invention is well suited for high density TPI (tracks per inch) recording. Importantly, no tracking servo is required. This improves the data capacity of the tape cartridge since the portion of the tape traditionally occupied by servo information is made available for data instead. The elimination of the tracking servo also decreases the number components and assemblies of the system, thereby reducing overall cost and lowering power demand. Advantages realized further include operation over a wide range of mechanical component and alignment tolerances. Improved data reliability is obtained under varying conditions of data interchange, temperature, humidity, shock, and vibration.

Figure 7A:
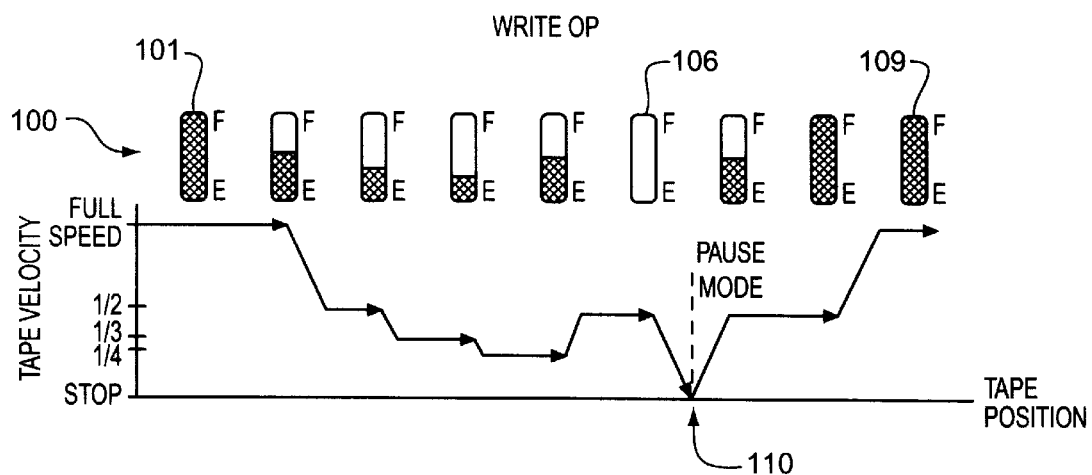
FIG. 7($a$) is a graphical view of tape speed plotted against tape position and further correlated with the content of a data buffer for an example write operation.

A WRITE operation for a variable speed architecture tape drive implemented in accordance with the invention is illustrated in FIG. 7(a). The tape speed is plotted against tape position and further correlated with the content of a data buffer 100, such as 64 in FIG. 2, whose various conditions are presented along the upper portion of the plot. When buffer 100 is loaded with data up to the "F" location, this indicates that buffer 100 is full, whereas when the data level is all the way down to the "E" location, this indicates that buffer 100 is empty. The proportional buffer contents between those two boundary states are shown by the shaded portion of each buffer. Thus, while the system might employ an array of storage locations to perform the buffer 100 function, the various locations shown in FIGS. 7(a) and 7(b) reflect the contents of the buffer 100 at particular points in time.

In the example WRITE operation of FIG. 7(a), it is assumed that the drive is initially moving at full speed and that the data buffer 100 is fully loaded at 101. As buffer 100 approaches empty, the speed of the drive is reduced, and vice versa, up to the point shown at 106 where the buffer is empty. At that time, a Pause Mode is entered wherein the tape speed is reduced to zero as at time point 110. However, receipt of any data into buffer 100 causes the driver to resume motion and ultimately regain full speed as at the end of the FIG. 7(a) plot.

As buffer 100 attains full status, the tape speed is shifted upwards until full speed is reached. Data draining of buffer 100 results in a slowing of the tape speed whereas detection of a filling buffer 100 results in a shift to a faster tape speed. If buffer 100 is empty, the tape is stopped as at 110 and the Pause Mode is entered. The next WRITE operation received from the host system is started from the paused tape position, but no repositioning of the tape occurs.

Figure 7B:
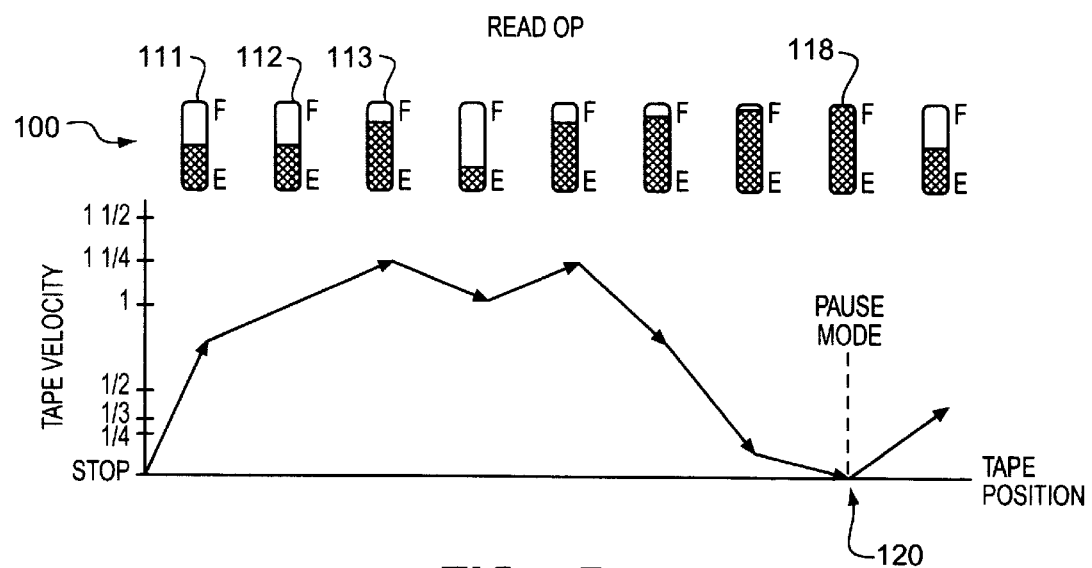

A READ operation for a variable speed architecture tape drive implemented in accordance with the invention is illustrated in FIG. 7(b). In this example, buffer 100 is shown filling at 111, 112 and 113, with the tape speed approaching a maximum of full speed. From an empty state, maximum acceleration is employed. The tape velocity is reduced as data buffer 100 fills. That is, as data buffer 100 approaches a full state, the tape speed is reduced to prevent data losses. When buffer 100 is completely filled as at 118, the tape is stopped and the Pause Mode is entered as shown at 120. The next read operation is commenced from position 120 without the need for any tape repositioning.

Figure 8:
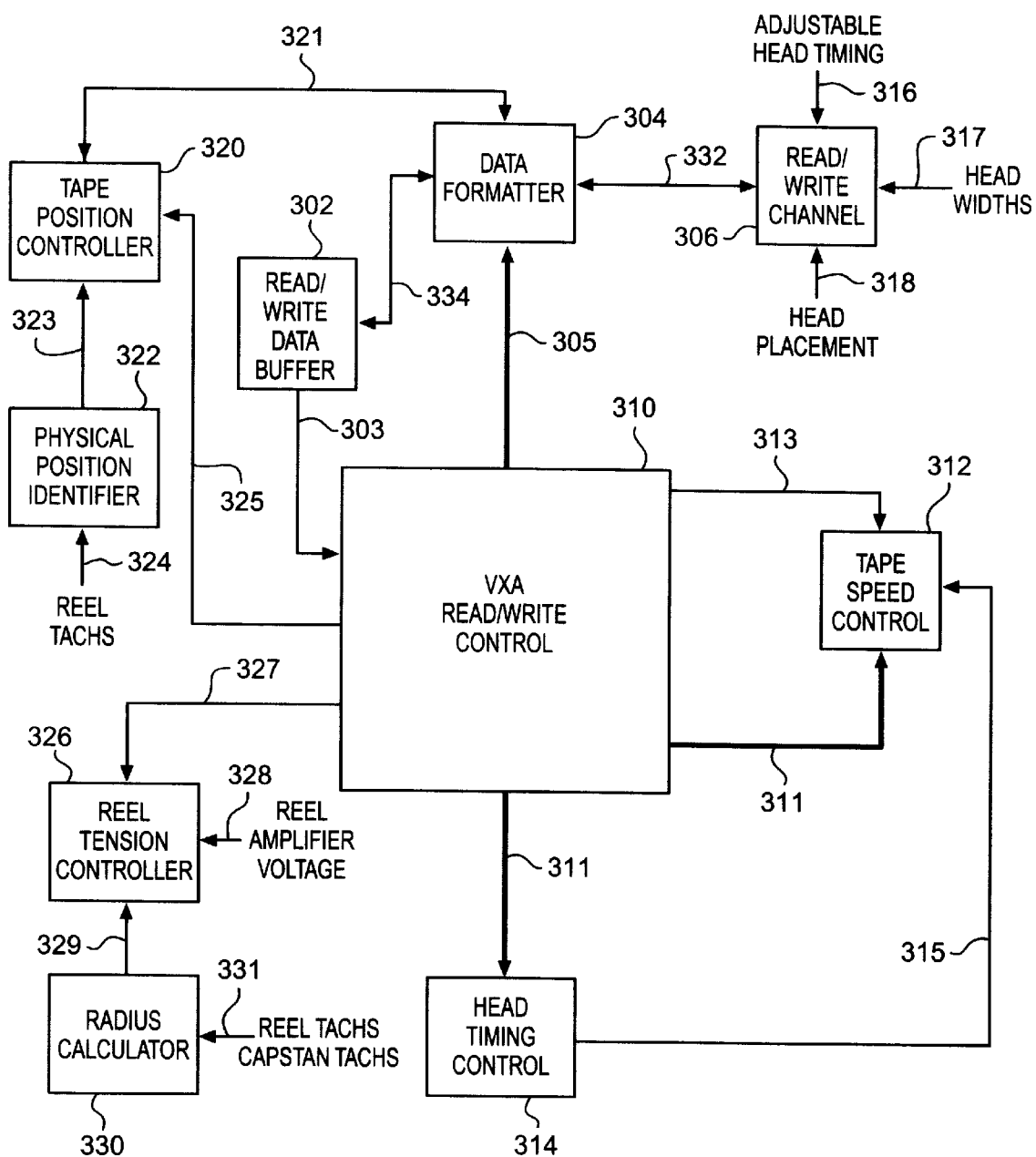
FIG. 8 is a block diagram of a variable speed architecture tape transport control system in accordance with the invention.

FIG. 8 is a block diagram of a variable speed architecture tape transport system 300 in accordance with the invention. In system 300 unformatted data 334 is entered into data buffer 302 during write mode and is formatted by data formatter 304. The formatted data 332 is recorded onto a magnetic tape by write channel circuitry 306. The head widths 317 and head placement 318 are selected to optimize the check after write and overscan performance. Adjustable head timing 316 allows the drive to automatically coordinate the time the read heads are activated with the physical position of the data written on the tape.

Radius calculator 330 continuously calculates the supply and takeup reel radii as tape moves between the supply real and the takeup reel. This calculation is based upon the capstan and reel tachs 331.

Data is removed from buffer 302 as it is written onto tape, and a data buffer level 303 is adjusted to reflect the current amount of data in the buffer relative to the maximum buffer capacity.

During read mode, read channel circuitry 306 recovers formatted data 332 from tape, which is deformatted by deformatter 304 and entered into data buffer 302. Unformatted data 234 is added to buffer 302 as it is read from tape and is removed from buffer 302 as it retrieved for transmission to a host system. Again, the data buffer level 303 is adjusted to reflect the current amount of data in the buffer relative to the maximum buffer capacity.

Controller 310 monitors the buffer level 303 to determine the appropriate transport speed (or position) of the tape. The appropriate speed (or position) of the tape may be different between read mode and write mode for a given buffer level 303, as described in conjunction with FIGS. 7(a) and 7(b). In either mode, however, controller 310 determines whether an adjustment of the current write speed is required based on the current buffer level 303. If the tape speed requires adjusting, controller 310 determines a new tape speed 311 based on the current buffer level 303. A head timing controller 314 synchronizes the change in tape speed with the detection of a beginning of a track on the tape. The details of the head timing controller 314 are described hereinafter. Tape speed controller 312 changes the speed (or position) of the tape in accordance with the new write speed 311 and a speed change enable signal 315 generated by head timing controller 314.

Figure 19:
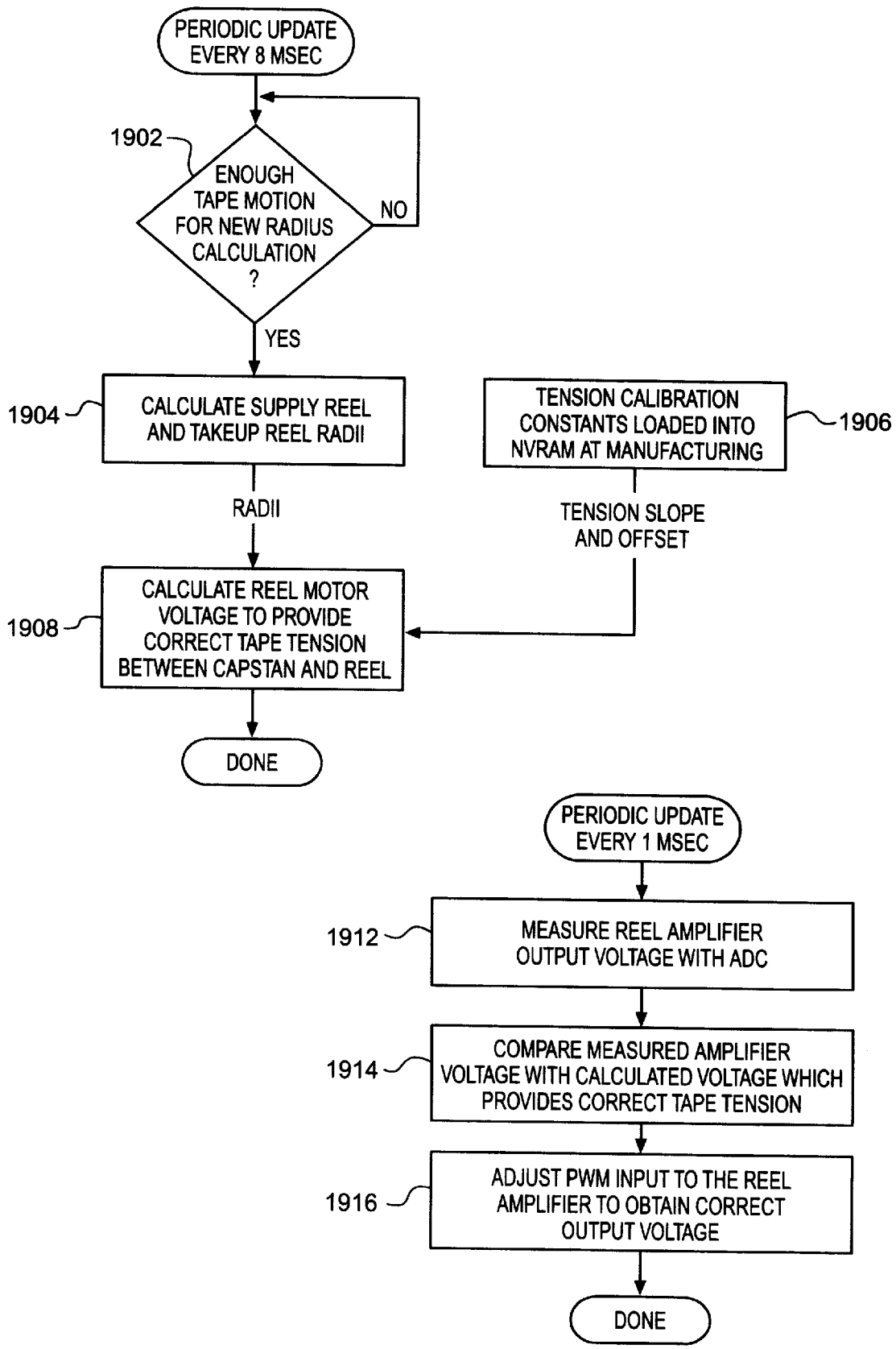
FIG. 19 is a flowchart of the operation of a reel tension controller in accordance with the invention.

Reel tension controller 326 controls the tape tension between the capstan and takeup reel during forward tape movement, and between the capstan and supply reel during backwards tape movement, as indicated by direction signal 327. During manufacturing, the values of reel amplifier voltage 328 for the correct tensions are stored in non-volatile RAM 66. When running, the reel tension controller 326 outputs a pulse width modulation (PWM) signal to the reel amplifier 72. The PWM signal changes based upon the radii 329 and the measured amplifier voltage 328. An illustrative embodiment of the method implemented by reel tension controller 326 is illustrated in FIG. 19.

As illustrated, the reel motor voltage is updated to provide the correct tape tension between the capstan and reel every 8 msec. In a first step 502, radius calculator 330 determines whether enough tape motion has occurred, based on the change in reel and capstan tachs 331, to justify a new radius calculation. If so, radius calculator 330 calculates the new radii 329 for the supply reel and takeup reel in step 504. The new radii 329 and the tension constants stored in NVRAM 66 corresponding to the current direction 327, which are stored in step 506, are used by reel tension controller 326 for calculating a reel motor voltage corresponding to the correct tape tension between the capstan and reel in step 508. The newly calculated reel motor voltage is applied to the reel motor to adjust the tension between the capstan and reel every millisecond. This is accomplished by performing the steps of measuring the reel amplifier output voltage in step 512, comparing the measured amplifier voltage with the calculated voltage in step 514 which provides the correct tape tension, and adjusting the input signal to the reel amplifier in step 516 to obtain the correct output voltage. And FIG. 20 is a flowchart of the calibration method used by reel tension controller.

As illustrated, in a step 602 the minimum voltage required to spin the takeup and supply reel hubs with the tape mechanism fully ejected is determined. These offset measurements are stored in non-volatile RAM 66 in step 604. A special "golden standard" torque tape cassette is loaded into the drive in step 606. The drive begins playing the special torque cassette in forward play mode in step 608. The forward tension slope is adjusted to achieve the correct tension between the capstan and takeup reel in a step 610. The drive then plays the special torque cassette in reverse play mode in step 612. The reverse tension slope is adjusted to achieve the correct tension between the capstan and supply reel in a step 614. The forward and reverse tension slopes are stored in non-volatile Ram 66 in step 616. This system maintains the correct tension as the radii vary and as the drive temperature or power supply voltages fluctuate. To accomplish this, other tape devices have used active tension sensors and dual reel motors or slip clutches in the supply and takeup hubs. The active tension sensors and dual reel motors added significant cost and complexity to the tape drive. The slip clutches provided inconsistent tension from unit to unit and over the life of the tape drive.

The position on tape, as indicated by tapecount 321 is calculated by physical position identifier 322 using the reel tachs 324. The tapecount 321 is defined as the sum of the supply reel and takeup reel tachs. As tape moves from the supply reel to the takeup reel, the count value increases. As tape moves from the takeup reel onto the supply reel, the count value decreases. Tapecount 321 is set to zero at the beginning of tape.

Highspeed tape repositioning is accomplished with tape position controller 320. The reel motor is used to reposition the tape to a target position 325 provided by the read/write controller 310.

Figure 9:
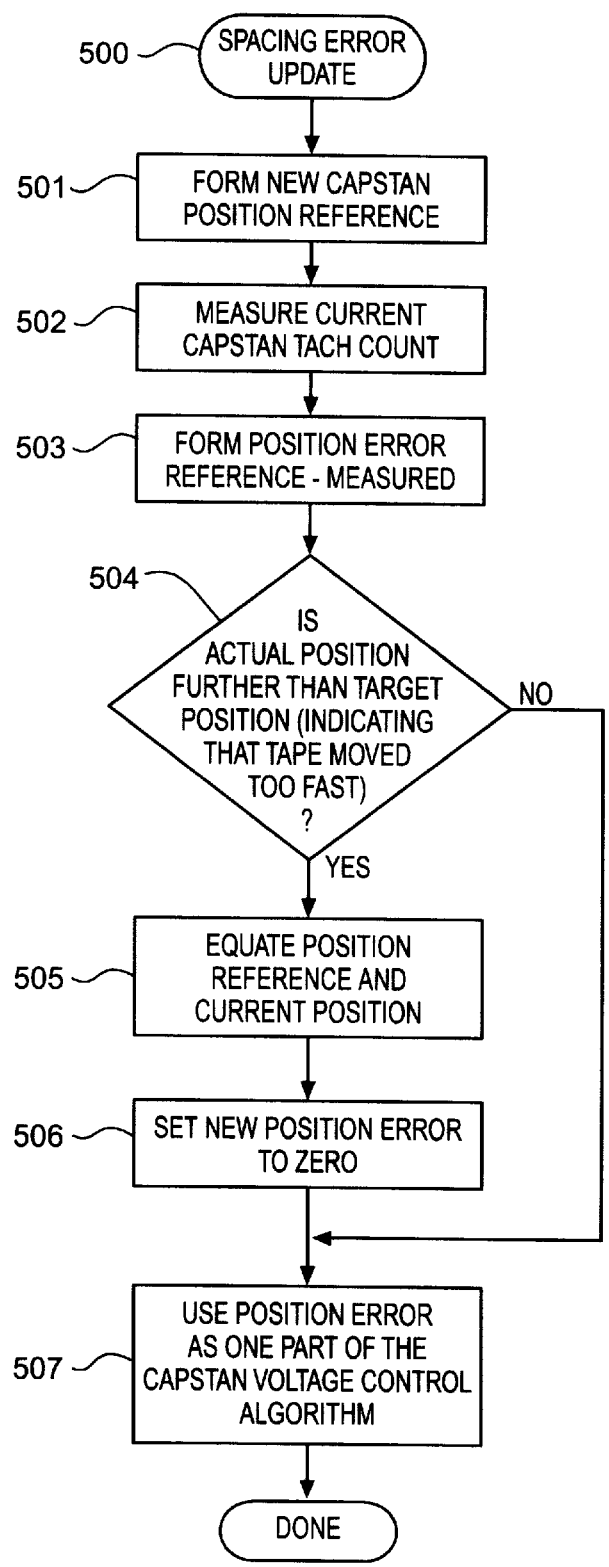
FIG. 9 is a flowchart of a method for preventing the writing of thin tracks.

A thin track could be written if the tape moves too slowly (i.e., reducing the track spacing). The condition of moving too slowly is detected as a speed error and/or position error. This detected error causes the track to be rewritten. Since rewriting a track reduces the amount of data that can be written on a tape, the number of rewrites are attempted to be minimizes. FIG. 9 is a flowchart of a method to prevent writing thin tracks. The track spacing error is calculated every predetermined interval (e.g., 1 msec) in step 500. A reference position is calculated based upon the desired tape speed in step 501. In step 502 the current tape spacing is inferred from the measured capstan tach 502. These two terms are used to form the track spacing error 503. If the track spacing is too large, as determined in step 504, it means that the tape has moved too quickly. If the spacing is too small, the tape has moved too slowly. The natural response is to slow down when the tape is moving too quickly. To avoid this, when the position is further than the target 505, the reference position is set in step 505 to the measured position. The new position error is then set to zero in step 506. The position error is used in step 507 by the read/write controller 310 as one parameter for determining the new read/write speed 311.

Figure 10:
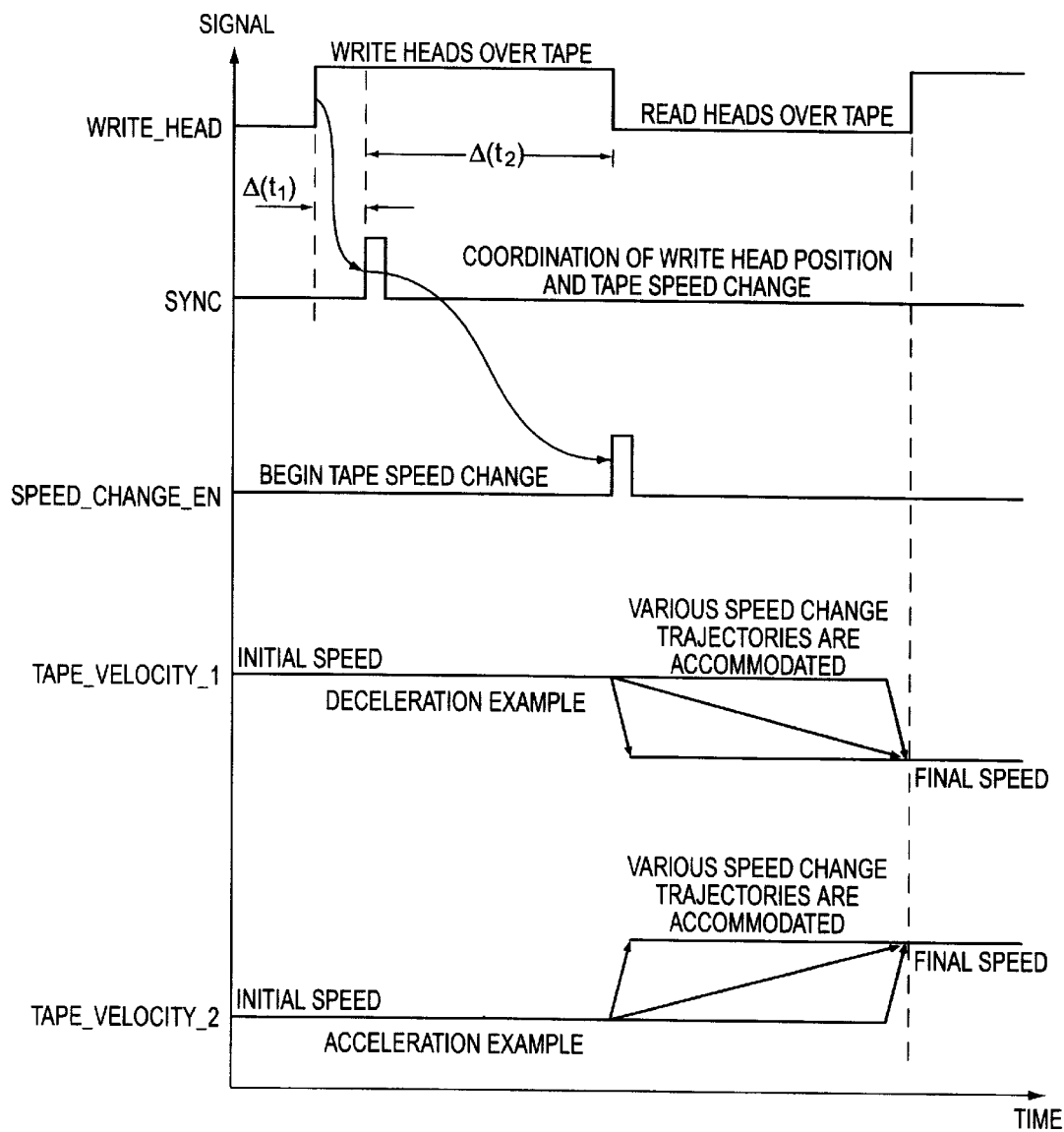
FIG. 10 is a timing diagram illustrating a method for the synchronization of the write head position relative to tracks on the tape with a change in tape speed.

FIG. 10 is a timing diagram illustrating the synchronization of the write head position relative to tracks on the tape with a change in tape speed, as performed by head timing controller 314. In this embodiment, head timing controller 314 receives a head type signal WRITE_HEAD that is logically high when the two recording, or "write", heads are positioned over the tape and logically low when the two CAW heads are positioned over the tape. Head timing controller 314 generates a SYNC pulse a predetermined time $\Delta(t1)$ after the rising edge of WRITE_HEAD. This triggers the output of speed change enable signal 315 SPEED_CHANGE_EN pulse a predetermined time $\Delta(t2)$ later, during the phase in which the read heads are positioned over the tape. Tape speed controller 312 adjusts the speed (or position) of the tape to the new speed 311 in synchronization with the SPEED_CHANGE_EN 315 pulse. The allowable difference in adjusted speed is limited to that which results in the final desired speed being achieved within the phase $\Delta(t3)$ in which the read head is over the tape. This ensures that the tape is moving at a constant speed during the time the track is being recorded (i.e., while the write heads are over the track) such that unintentional track curvature does not result. FIG. 10 illustrates an example of the actual tape velocity for a deceleration example, labeled TAPE_VELOCITY_1, and an acceleration example, labeled TAPE_VELOCITY_2. In both the deceleration and acceleration examples, the actual initial speed and actual final speed may represent different values anywhere between the maximum and minimum speeds in order to accommodate various speed change trajectories.

Figure 11:
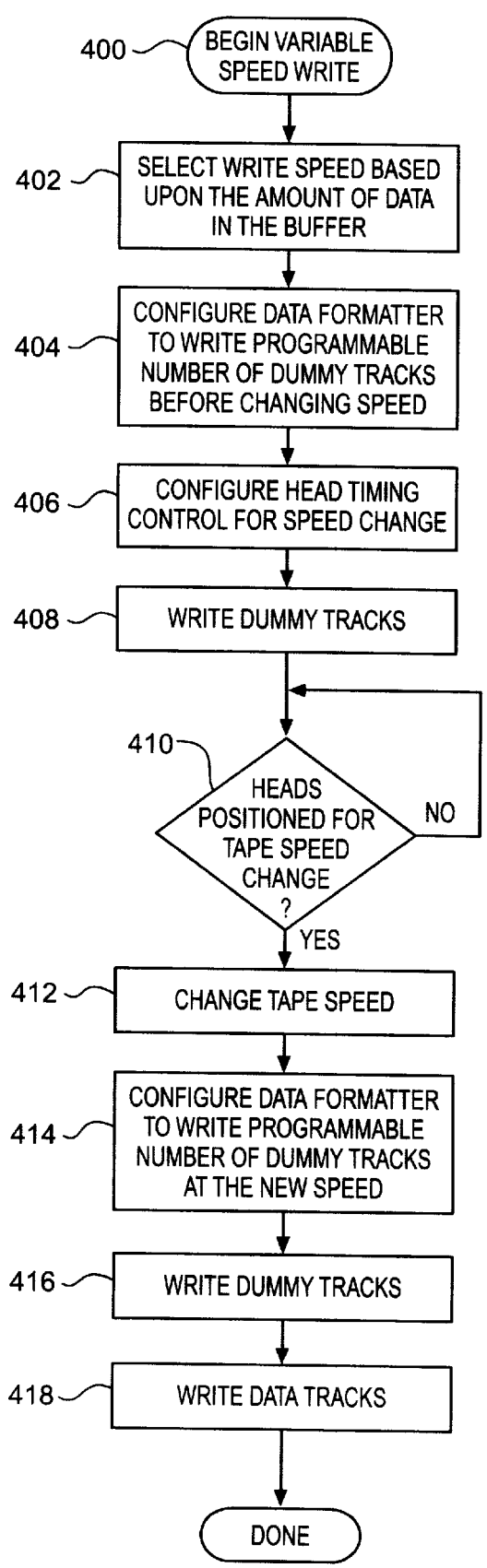
FIG. 11 is a flowchart of one embodiment of a method for recording at variable tape speeds.

FIG. 11 is a flowchart of the method employed by the variable speed architecture of the tape drive while it is in write mode. According to the method, variable speed recording is begun in step 400 when the drive enters write mode. An initial tape speed is selected in step 402 based on the amount of data present in the data buffer 302. The data formatter 304 is configured in step 404 to write a predetermined number of dummy tracks before changing speed. The head timing controller 314 is configured for a speed change in step 406. The dummy tracks are poised to be written to tape via the write channel circuitry 306 in step 408. Meanwhile, head timing controller 314 monitors the position of the heads in step 410, generating speed change enable signal SPEED_CHANGE_EN in synchronization with the beginning of the phase in which the read heads are positioned over the tape. Tape speed controller 312 changes the speed of the tape to the new speed in step 412. Meanwhile, data formatter 304 is configured to write a programmable number of data tracks in step 414, which are written to tape the next time the write heads are positioned over the track in step 416, followed by writing actual data tracks in step 418 containing data (formatted into data tracks) from the buffer 302.

Figure 12A:
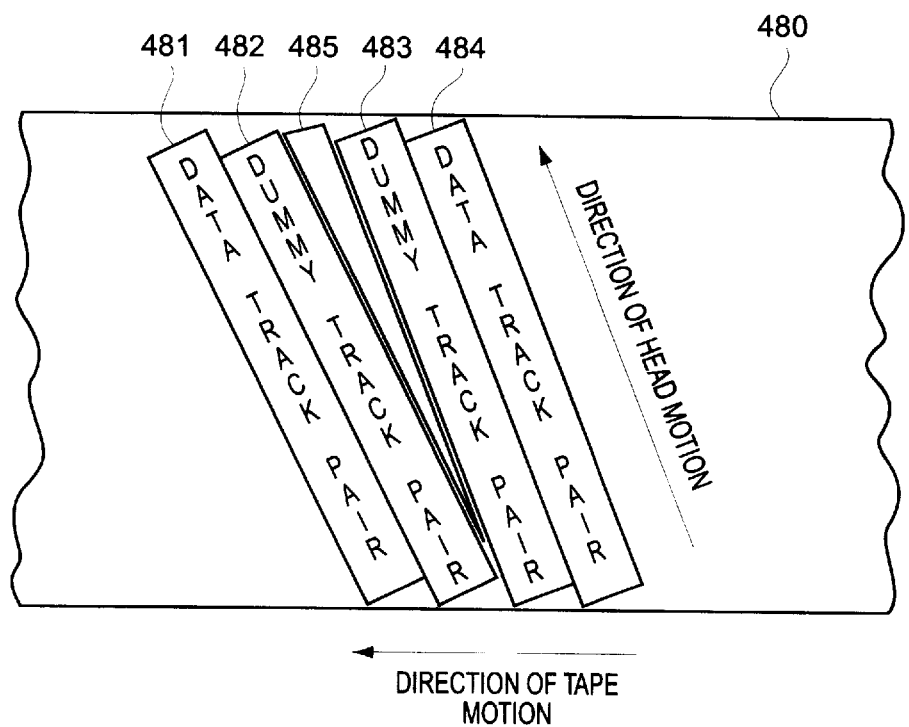
FIG. 12($a$) is a side view of a portion of tape that illustrates recorded track angle changes resulting from an acceleration in tape speed.
Figure 12B:
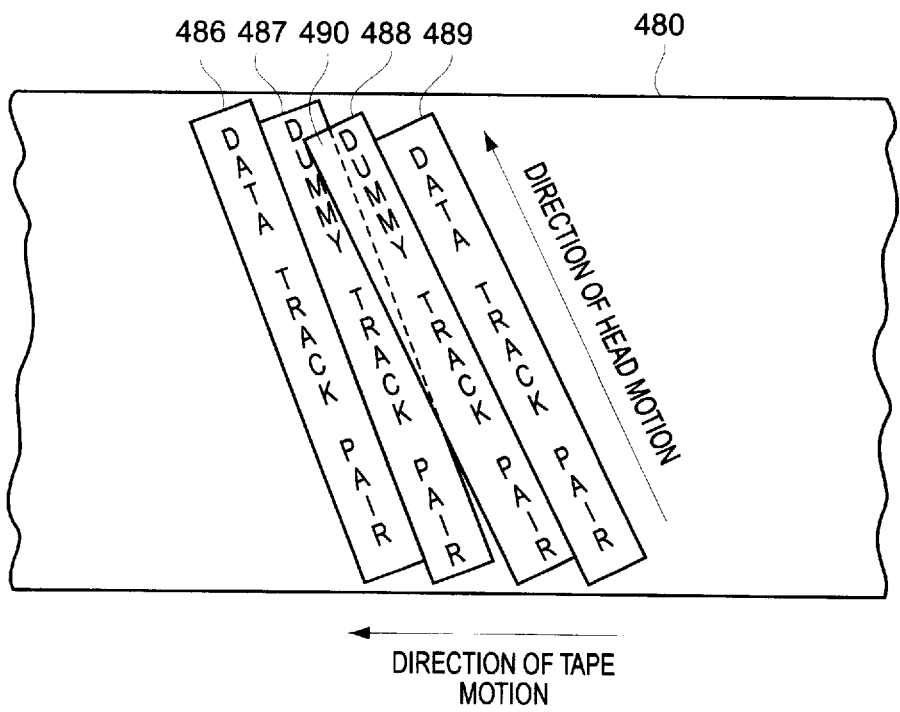

FIGS. 12(a) and 12(b) illustrate recorded track angle changes resulting from a respective deceleration and acceleration in tape speed. When the tape speed is decelerated while writing a number of data track pairs 481 to tape 480, as shown in FIG. 12(a), a predetermined number of dummy track pairs 482 is first written to tape at the current speed. The speed is decreased while the read heads are over the track. On the next write head phase, a predetermined number of dummy track pairs 483 followed by more data track pairs 484 are written to the tape at the new slower speed. As shown, this results in a "residue" zone 485 on tape 480 wherein data is indeterminate. The residue zone 485 does not affect the reliability of any data written onto the tape, however, since no data tracks overlap.

When the tape speed is accelerated while writing a number of data track pairs 486 to tape 480, as shown in FIG. 12(b), a predetermined number of dummy track pairs 487 are first written to tape at the current speed. The speed is increased while the read heads are over the track. On the next write head phase, a predetermined number of dummy track pairs 488 followed by more data track pairs 489 are written to the tape at the new faster speed. As shown, this results in an overlap zone 490 between dummy track pair 487 and dummy track pairs 488. The overlap zone 490 does not affect the reliability of any data written onto the tape, however, since it occurs only between dummy track pairs 488 and 489.

Figure 13A:
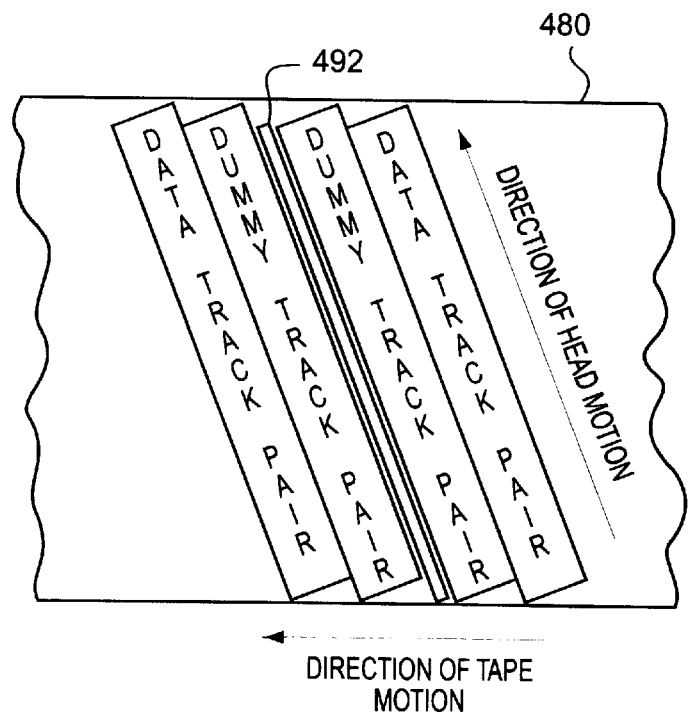
FIG. 13($a$) is a side view of a portion of tape that illustrates a residue zone resulting from variations in the acceleration control after an acceleration in tape speed from a completely stopped position.
Figure 13B:
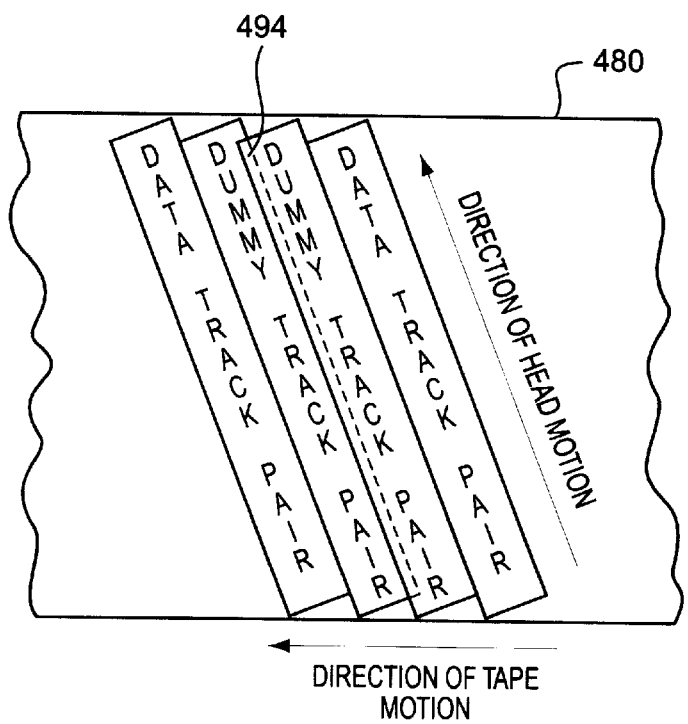

If the tape speed is accelerated from a completely stopped position, for example after resuming from a paused mode as at 110 in FIG. 7(a), variations in the acceleration control may result in either residue zones 492 or overlap zones 494 as illustrated respectively in FIGS. 13(a) and 13(b). However, dummy track pairs are again written both before acceleration and after acceleration just as during a normal acceleration operation, so these regions do not affect the reliability of the data written to tape from the paused mode.

Figure 14:
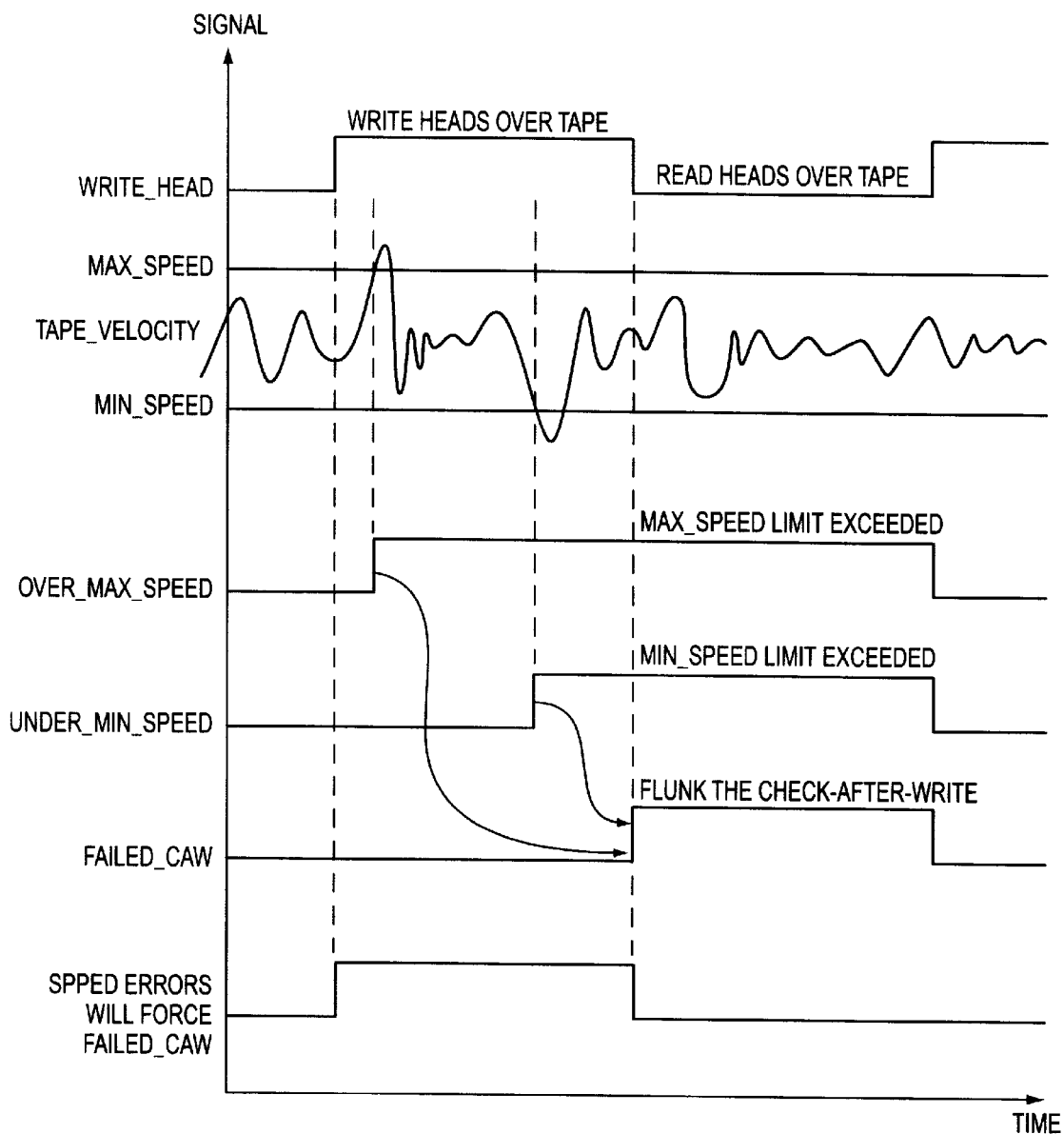
FIG. 14 is a timing diagram illustrating the detection of speed errors encountered while the drive is in write mode.

FIG. 14 is a timing diagram illustrating the detection of speed errors encountered during the read-back-check of the data by the tape speed controller 312 while the drive is in write mode. In this example, the capstan signal WRITE_HEAD indicates the position of the write head over the tape. A maximum speed threshold and minimum speed threshold are programmable and set to values which, if respectively exceeded or not met, could possibly lead to a residue zone or overlap region regardless of the type of track being written. This is undesirable if the tracks being written are actual data tracks. Accordingly, in the illustrative embodiment, if the tape speed TAPE_VELOCITY does not remain between the thresholds MAX_SPEED and MIN_SPEED, a respective threshold violation signal OVER_MAX_SPEED or UNDER_MIN_SPEED is asserted, which results in the assertion of check-after-write fail signal FAILED_CAW 313.

Figure 15:
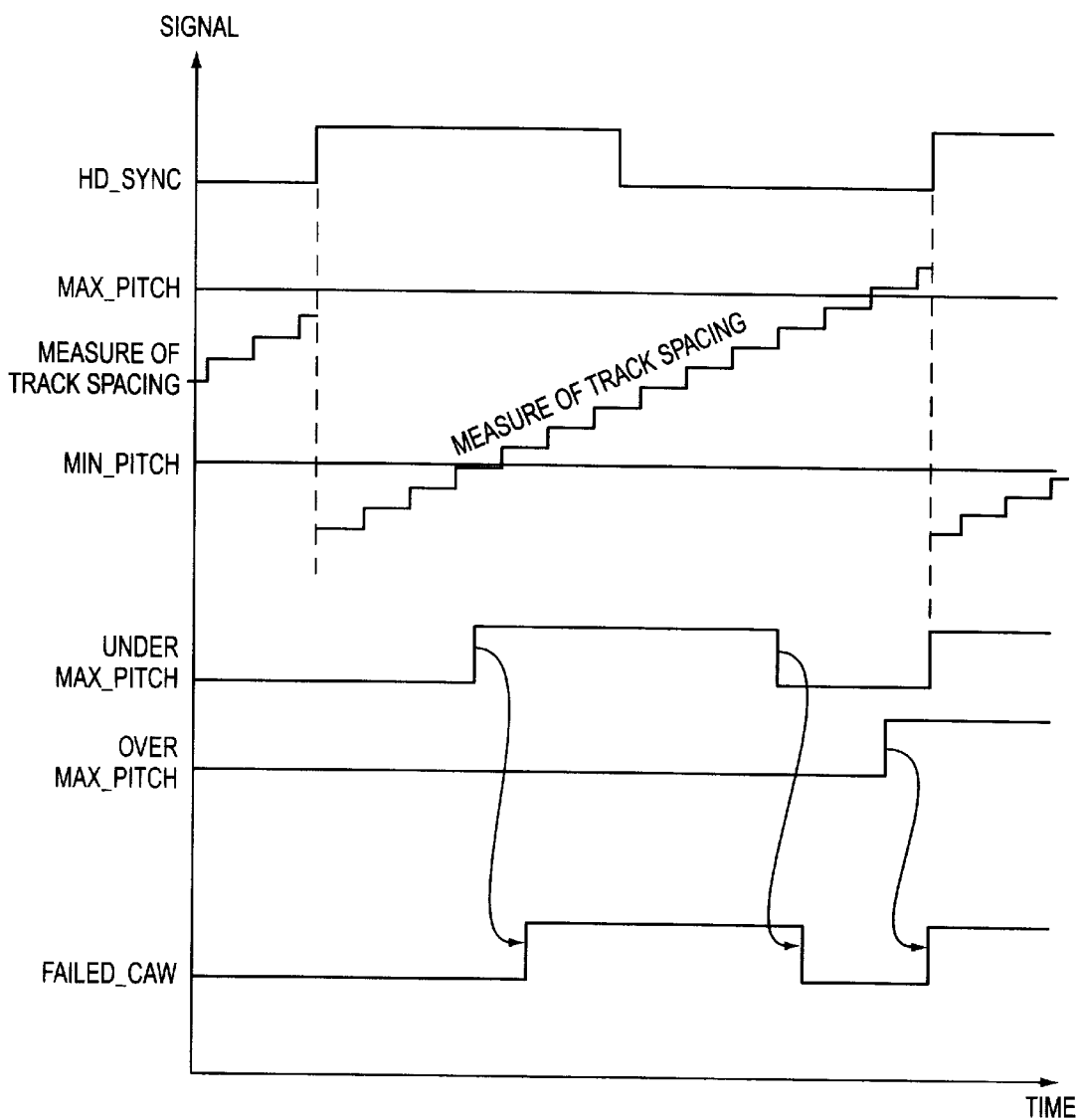
FIG. 15 is a timing diagram illustrating the detection of track pitch errors encountered while the drive is in write mode.

Check-after-write fail signal FAILED_CAW 313 may also be raised due to unacceptable tape position control. FIG. 15 illustrates the response of tape speed controller 312 to a violation of a position control failure. In this example, a measure of the track spacing is taken and compared to a programmable maximum spacing threshold MAX_PITCH and minimum spacing threshold MIN_PITCH. If the measured track pitch is below the minimum spacing threshold MIN_PITCH, error signal UNDER_MIN_PITCH is signaled; if the measured track pitch is beyond the maximum spacing threshold MAX_PITCH, error signal OVER_MAX_PITCH is signaled. The generation of either error signal UNDER_MIN_PITCH or OVER_MAX_PITCH asserts the check-after-write fail signal FAILED_CAW 313, which causes the offending track to be rewritten.

Figure 16:
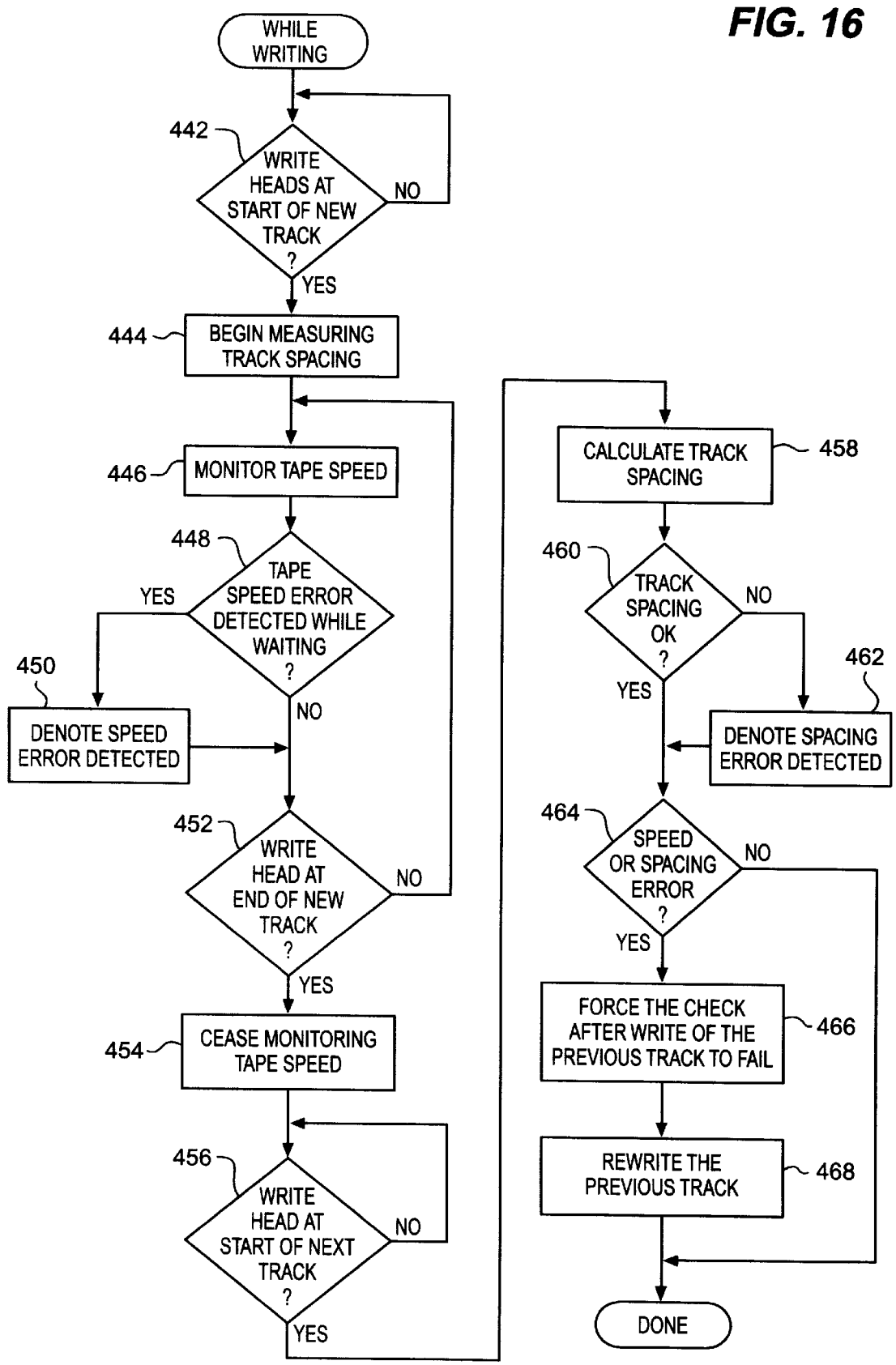
FIG. 16 is a flowchart of one embodiment of a method for detecting conditions for rewriting a track.

FIG. 16 is a flowchart of the method used by tape speed controller 312 to detect conditions for rewriting a track. When the drive is in write mode, the capstan tachometer signal WRITE_HEAD is monitored in step 442 until it indicates that the write heads are positioned at the beginning of a new track. Once the write heads are positioned over a new track, the drive begins to measure the track pitch in step 444. The tape speed is monitored in step 446 and compared in step 448 to the maximum and minimum speed thresholds MAX_SPEED and MIN_SPEED as shown in FIG. 14 to detect any threshold violations. If a threshold violation is detected the particular speed threshold violation is denoted in step 450. In step 452, the position of the tape is checked to determine whether the write heads have reached the end of the new track. If not, steps 446, 448, and 450 (if appropriate) are repeated. Once the write heads have reached the end of the new track in step 454, the tape speed signal is no longer monitored. The position of the write heads is continuously monitored in step 456 until the beginning of the next track is detected, at which time the track pitch is calculated in step 458. The track pitch is compared in step 460 to the maximum and minimum allowed track pitches MAX_PITCH and MIN_PITCH to detect any pitch threshold violations. If a track pitch threshold violation is detected, the particular position threshold violation is denoted in step 462. If a speed or position threshold violation as determined to have occurred during step 464, the check-after-write fail signal FAILED_CAW is asserted in step 466 to indicate that the check-after-write of the previous track failed. The previous track is then rewritten in step 468.

Figure 17:
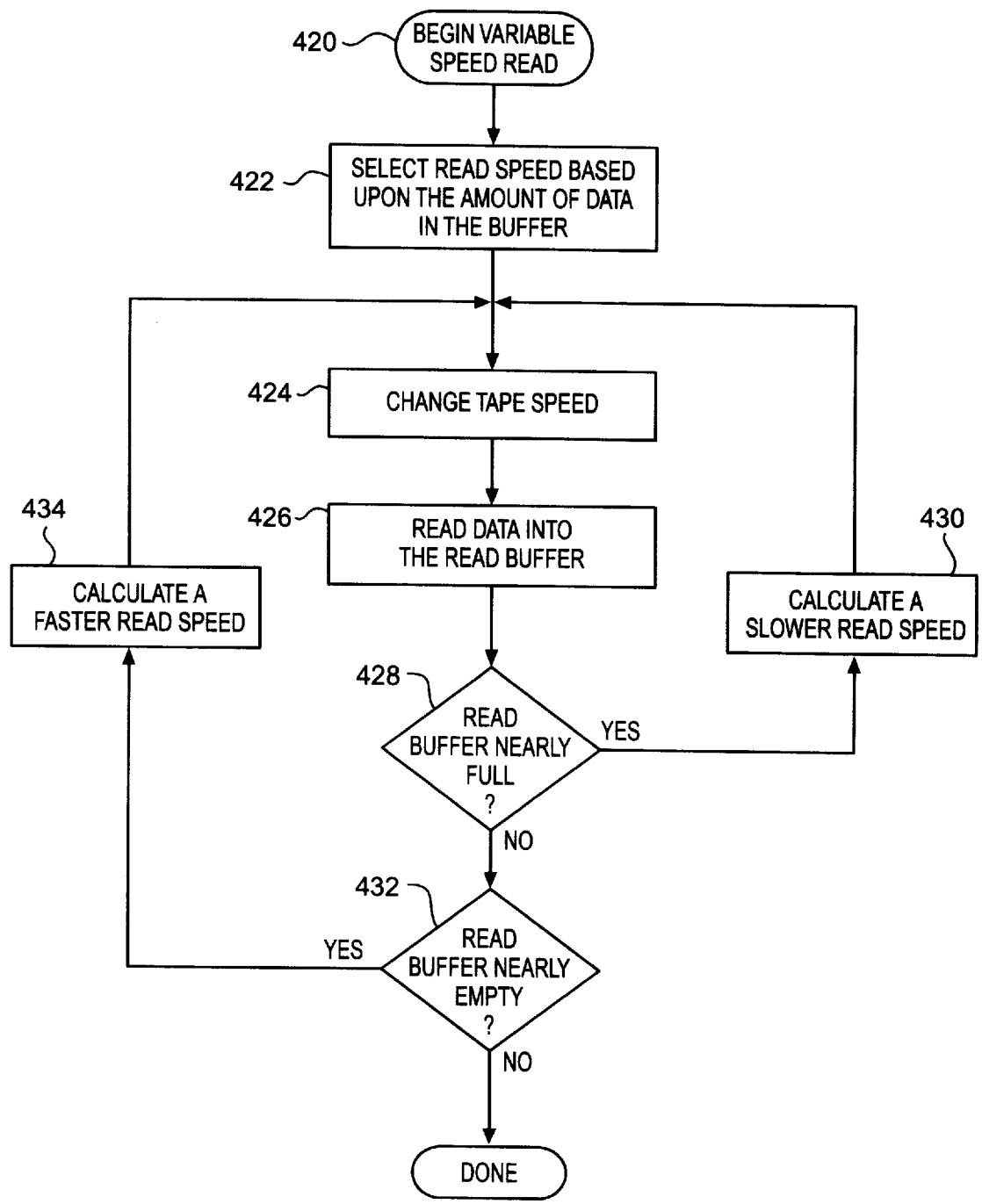
FIG. 17 is a flowchart illustrating one embodiment of a method for adjusting the tape speed during read mode.

FIG. 17 is a flowchart illustrating the method employed by the variable speed architecture of the tape drive while it is in read mode. According to the method, variable speed reading is begun in step 420 when the drive enters read mode. An initial tape speed is selected in step 422 according to the amount of data present in the data buffer 302. The head timing controller 314 is configured for a speed change in step 424. Head timing controller 314 monitors the position of the heads in step 410, generating speed change enable signal SPEED_CHANGE_EN in synchronization with read heads positioned over the tape. This triggers tape speed controller 312 to change the speed of the tape to the new speed. Read channel circuitry 306 reads data from the tape, which is deformatted by deformatter 304 and put into data buffer 322 in step 426. The buffer level 303 indicating the current amount of data in buffer 322 relative to its maximum capacity is monitored in step 428. If the buffer level 303 indicates that data buffer 302 is nearly full (relative to a predetermined threshold), controller 310 calculates a slower read speed in step 430, and steps 424, 426, and 428 are repeated. If the buffer level 303 indicates that data buffer 302 is nearly empty (relative to a predetermined threshold) in step 432, controller 310 calculates a faster read speed in step 434 and steps 424–428 are repeated. If the buffer level appears to remain steady (indicating that the data transfer rate is sustained at a streaming rate), no adjustment in speed is made.

It will be appreciated by those skilled in the art that any number of buffer level thresholds may be set which result in a tape speed change more or less often. Furthermore, each buffer level threshold may be set at any level between those representing a full and empty buffer, preferably at levels determined to optimize the matching of the tape speed to that of the host system.

Figure 18A:
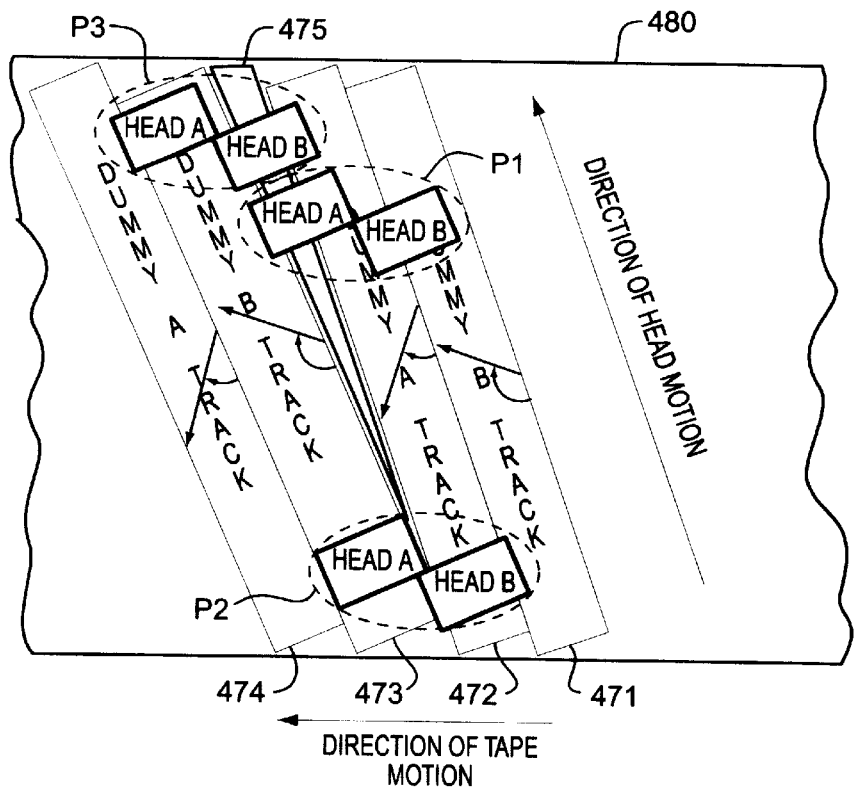
FIG. 18($a$) is a side view of a portion of tape that illustrates how data is read from a tape having track angle changes resulting from a acceleration in tape speed.
Figure 18B:
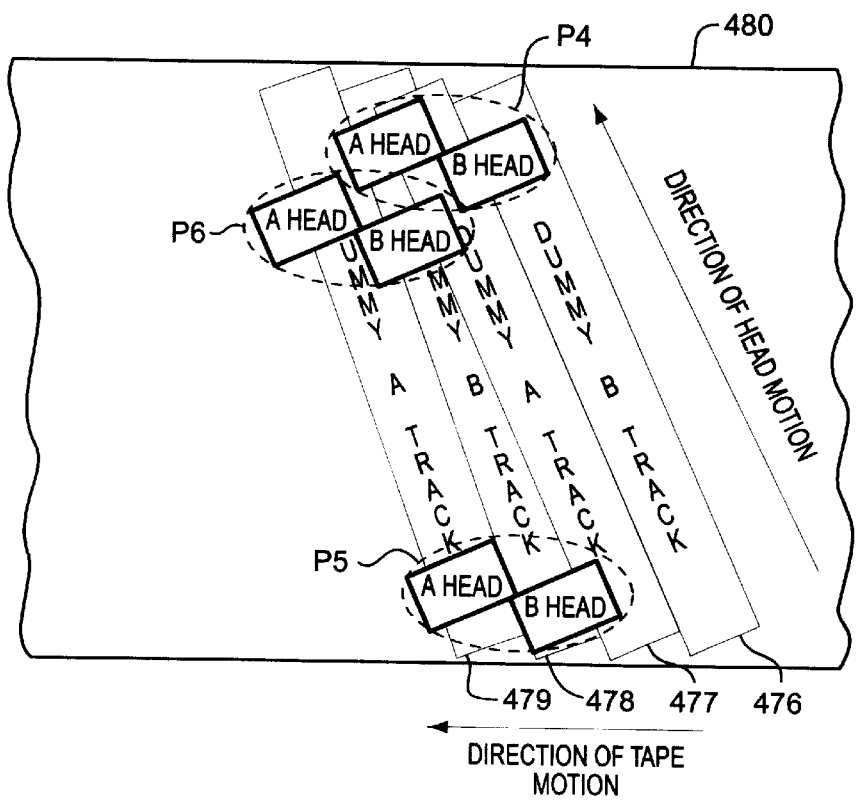

FIGS. 18(a) and 18(b) illustrate how data is read from a tape having track angle changes resulting from a respective deceleration and acceleration in tape speed. When the tape 480 contains a residue zone 475 resulting from a deceleration in tape speed during write mode, as shown in FIG. 18(a), portions of opposite-azimuth dummy track pairs 471 and 472 are read first by leading write head A and then by trailing write head B one revolution of the drum later. If the angle of the heads with respect to the tracks 471–474 do not match, any given head A or B will not read an entire track during a first pass. Instead, as illustrated in the example of FIG. 18(a), at position P1 leading head A can read portions of dummy A-azimuth track 472 and any old A-azimuth data found in the residue zone 475, while trailing head B can read portions of dummy B-azimuth track 471. At position P1 any A-azimuth data from dummy track 471 is not read by head A and any A-azimuth data from dummy track 472 is not read by head B due to the opposite azimuths of the tracks and the ability of the heads to detect data written along the appropriate azimuth. At position P2 head A is completely aligned over dummy B-azimuth track 473 and head B is completely aligned over dummy A-azimuth track 474, and hence neither head A nor B detect any data. At position P3 head A is positioned over a portion of dummy A-azimuth track 474 and a portion of dummy B-azimuth track 473, and hence detects only A-azimuth data from track 474 indicating that it is a dummy track. Head B is positioned over a portion of dummy B-azimuth track 473, a portion of residue zone 475, and a portion of dummy A-azimuth track 472, and hence detects any B-azimuth data from track 473 indicating that it is a dummy track, and any old B-azimuth data present in residue zone 475 left over from a previous recording. Data formatter 304 must therefore keep track of, and discard, any detected data found between two adjacent dummy tracks.

When the tape 480 contains an overlap region resulting from an acceleration in tape speed during write mode, as shown in FIG. 18(b), the use of dummy tracks again ensures reliable data recovery as follows. Portions of opposite-azimuth dummy track pairs are read first by leading write head A and then by trailing write head B one revolution of the drum later. If the angle of the heads with respect to the tracks 476–479 do not match, any given head A or B will not read an entire track during a first pass. Instead, as illustrated in the example of FIG. 18(b), at position P4 leading head A can read portions of dummy A-azimuth track 477 and dummy A-azimuth track 479, while trailing head B can read portions of dummy B-azimuth track 476. At position P4 any A-azimuth data from dummy track 478 is not read by head A and any A-azimuth data from dummy track 477 is not read by head B due to the opposite azimuths of the tracks. At position P5 head A is completely aligned over dummy A-azimuth track 479 and head B is completely aligned over dummy A-azimuth track 478, and hence heads A and B both detect correct data. At position P6 head A is positioned over a portion of dummy A-azimuth track 479, and hence detects A-azimuth data from track 479 indicating that it is a dummy track. Head B is positioned over a portion of dummy A-azimuth track 479, a portion of dummy B-azimuth track 478, and a portion of dummy A-azimuth track 477, and hence detects only B-azimuth data from track 478 indicating that it is a dummy track. Accordingly, because all detected data during this portion of the tape is a dummy track of one azimuth or the other, and hence not entered into the data buffer, the use of dummy tracks immediately before and after changing tape speeds during write mode eliminates any data recovery problems when the same portion of the tape is read during read mode.

It will be appreciated from the above description of the invention that the dynamic variable tape speed control, in combination with the ready mode, dramatically boost performance during read and write operations, when the host system cannot achieve or maintain the tape drive's rated throughput. The variable speed architecture produces a match of the average data transfer rate of a host computer and eliminates tape repositioning cycles. The read data rate is continuously variable. The architecture of the invention operates to slow the tape speed to enhance read accuracy. This is particularly valuable when interchanging data tapes amongst similar tape drives. Accordingly, back up and restore times are accelerated through the elimination of backhitching.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for recording data at variable speeds onto a magnetic tape that is being transported across a rotating drum at a current tape transport speed, said rotating drum having a recording head disposed thereon to pass over said tape upon rotation of said drum, said data being received from a host system and temporarily stored in a data buffer, said method comprising:

monitoring a current buffer level of said data buffer, said current buffer level indicating an amount of data currently present in said data buffer;

determining a new tape transport speed based on said current buffer level;

writing a first predetermined number of dummy tracks onto said magnetic tape at said current tape transport speed;

adjusting said current tape transport speed to said new tape transport speed; and writing a second predetermined number of dummy tracks onto said magnetic tape at said new tape transport speed immediately after said first predetermined number of dummy tracks;

wherein said current tape transport speed and said new tape transport speed are each non-zero and different from one another.

2. A method in accordance with claim 1, comprising:

recording a second data track onto said magnetic tape at said new tape transport speed immediately after said second predetermined number of dummy tracks.

3. A method in accordance with claim 2, comprising:

recording a first data track onto said magnetic tape at said current tape transport speed immediately before said first predetermined number of dummy tracks.

4. A method in accordance with claim 2, comprising:

measuring said current tape transport speed;

determining whether said current tape transport speed is outside a speed control limit; and if said current tape transport speed is outside said speed control limit, performing the steps of:
setting said new tape transport speed to a speed within said speed control limit;
adjusting said current tape transport speed to said new tape transport speed; and
re-recording said second data track onto said magnetic tape at said new tape transport speed.

5. A method in accordance with claim 2, comprising:

measuring a track pitch, said track pitch comprising the distance between said recorded second data track and an immediately-previous previously-recorded track;

determining whether said track pitch is outside a track pitch control limit; and if said track pitch is outside said track pitch control limit, performing the steps of:
  setting said new tape transport speed to a speed that will place a next measured track pitch within said track pitch control limit;
  adjusting said current tape transport speed to said new tape transport speed; and
  re-recording said second data track onto said magnetic tape at said new tape transport speed.

6. A method in accordance with claim 2, comprising:
reading back said recorded second data track at said new tape transport speed immediately after said recorded second data track is recorded onto said magnetic tape.

7. A method in accordance with claim 6, comprising:
re-recording said second data track if said recorded second data track is unreadable.

8. A method in accordance with claim 1, wherein said new tape transport speed is slower than said current tape transport speed.

9. A method in accordance with claim 1, wherein:
said new tape transport speed is faster than said current tape transport speed.

10. A method in accordance with claim 1, wherein:
said adjusting step comprises:
commencing said speed adjustment when said rotating drum is positioned such that said recording head is not positioned over said tape; and
completing said speed adjustment before said recording head becomes positioned over said tape.

11. A method in accordance with claim 1, comprising:
reading a track from said magnetic tape at said new speed.

12. A method in accordance with claim 1, comprising:
halting tape transport such that a current tape transport speed is reduced to zero after writing said first predetermined number of dummy tracks when said data buffer is empty.

13. A method in accordance with claim 12, wherein:
said first tape transport speed is identical to said second tape transport speed.

* * * * *